US012580983B2

(12) United States Patent (10) Patent No.: US 12,580,983 B2
Tang et al. (45) Date of Patent: Mar. 17, 2026

(54) DATA TRANSMISSION METHOD AND COMMUNICATION APPARATUS

(71) Applicant: Huawei Technologies Co., Ltd., Guangdong (CN)

(72) Inventors: Feilong Tang, Shanghai (CN); Xu Li, Shanghai (CN); Haibo Zhang, Beijing (CN); Huimin Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 18/314,342

(22) Filed: May 9, 2023

(65) Prior Publication Data

US 2023/0275962 A1 Aug. 31, 2023

Related U.S. Application Data

(63) Continuation of application No. PCT/CN2021/129299, filed on Nov. 8, 2021.

(30) Foreign Application Priority Data

Nov. 10, 2020 (CN) .......................... 202011249398.4

(51) Int. Cl.
*H04L 67/62* (2022.01)
*H04L 67/1061* (2022.01)
*H04L 67/1074* (2022.01)

(52) U.S. Cl.
CPC ...... *H04L 67/1078* (2013.01); *H04L 67/1061* (2013.01); *H04L 67/62* (2022.05)

(58) Field of Classification Search
CPC .. H04L 67/1078; H04L 67/1061; H04L 67/62
See application file for complete search history.

(56) References Cited

U.S. PATENT DOCUMENTS

| | | | |
|---|---|---|---|
| 9,578,584 B1 * | 2/2017 | Oroskar ................ | H04L 5/0007 |
| 2003/0026279 A1 * | 2/2003 | Onoda .................... | H04L 47/83 |
| | | | 370/428 |
| 2004/0151187 A1 | 8/2004 | Lichtenstein | |
| 2007/0097953 A1 | 5/2007 | Lesartre et al. | |

(Continued)

FOREIGN PATENT DOCUMENTS

| | | |
|---|---|---|
| CN | 102387559 A | 3/2012 |
| CN | 105578455 A | 5/2016 |

(Continued)

*Primary Examiner* — Soe Hlaing
(74) *Attorney, Agent, or Firm* — WOMBLE BOND DICKINSON (US) LLP

(57) ABSTRACT

Embodiments of this application disclose a data transmission method and a communication apparatus. The method may be applied to a data transmission or data distribution scenario in a peer-to-peer P2P network. The method includes: A first end node sends delayed transmission information to a second end node, where the delayed transmission information indicates time information at which the first end node delays sending first data to the second end node. When determining that the second end node accepts the delayed transmission information, the first end node delays sending the first data to the second end node, to alleviate a load of the first end node, so that a network congestion problem caused by a large-scale concurrent data request can be resolved.

20 Claims, 11 Drawing Sheets

(56) References Cited

U.S. PATENT DOCUMENTS

| | | | | |
|---|---|---|---|---|
| 2012/0014305 A1* | 1/2012 | Kakani | ................. | H04W 76/14 |
| | | | | 370/311 |
| 2015/0009906 A1* | 1/2015 | Dore | .................... | H04L 5/0007 |
| | | | | 370/329 |
| 2015/0036570 A1* | 2/2015 | Jeong | ............... | H04W 52/0216 |
| | | | | 370/311 |
| 2022/0141156 A1* | 5/2022 | Bush | .................... | H04L 47/781 |
| | | | | 370/401 |

FOREIGN PATENT DOCUMENTS

| | | | |
|---|---|---|---|
| CN | 107867247 A | 4/2018 |
| CN | 110268689 A | 9/2019 |
| WO | 2017016383 A1 | 2/2017 |

\* cited by examiner

Figures 7, 8:
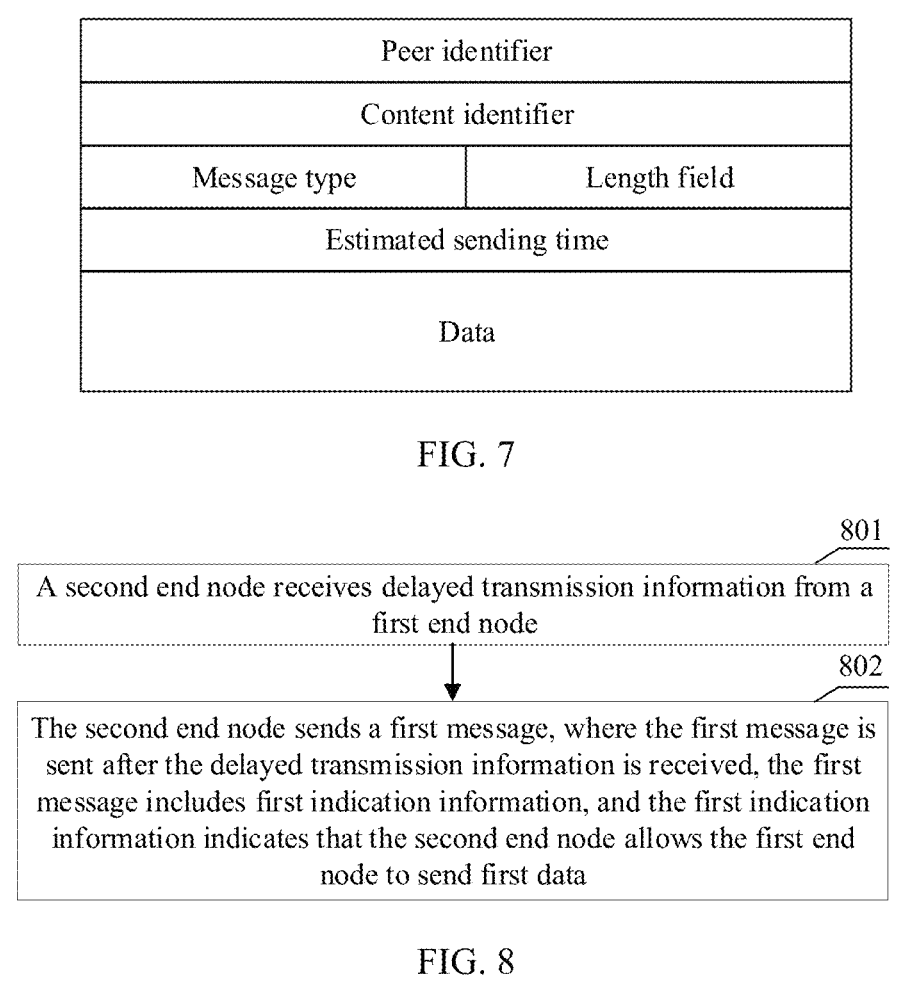

| Peer identifier | |
|---|---|
| Content identifier | |
| Message type | Length field |
| Estimated sending time | |
| Data | |

A second end node receives delayed transmission information from a first end node

802

The second end node sends a first message, where the first message is sent after the delayed transmission information is received, the first message includes first indication information, and the first indication information indicates that the second end node allows the first end node to send first data

DATA TRANSMISSION METHOD AND COMMUNICATION APPARATUS

CROSS-REFERENCE TO RELATED APPLICATIONS

This application is a continuation of International Application No. PCT/CN2021/129299, filed on Nov. 8, 2021, which claims priority to Chinese Patent Application No. 202011249398.4, filed on Nov. 10, 2020. The disclosures of the aforementioned applications are hereby incorporated by reference in their entireties.

TECHNICAL FIELD

This application relates to the data transmission field, and in particular, to a data transmission method and a communication apparatus.

BACKGROUND

A peer-to-peer (P2P) network is an internet system that has no central server and that relies on peers to exchange information. The peer-to-peer network functions to reduce end nodes in previous network transmission, to reduce a risk of data loss. The peer-to-peer network differs from a central network system (corresponding to a centralized architecture) with a central server in that each user end is an end node and also has a function of a server. In the peer-to-peer network, users (namely, terminals) can directly communicate, share resources, and cooperate with each other, and terminal resources can be fully used.

Compared with the centralized architecture, a distributed architecture based on a P2P transmission technology can avoid single points of failure and triangular routing, achieve higher reliability and scalability, and is easier to deploy. A currently used distributed transmission solution based on the P2P transmission technology is as follows: A requesting end node broadcasts a data request to neighboring end nodes. When a plurality of data source end nodes (namely, end nodes storing data corresponding to the data request) receive the data request, the data source end nodes send data to the requesting end node at the same time. In this transmission solution, redundant transmission of data is caused, and a network load is increased.

SUMMARY

Embodiments of this application disclose a data transmission method and a communication apparatus, to implement a transmission solution of reducing redundant transmission of data to reduce a network load.

In some embodiments, this application provides a data transmission method. The method includes: A first end node sends delayed transmission information to a second end node, where the delayed transmission information indicates first time information at which the first end node sends first data to the second end node; the first end node determines that the second end node accepts the delayed transmission information; and the first end node sends the first data to the second end node at target time based on the first time information, where the target time is determined based on the first time information; or the first end node determines that the second end node refuses the delayed transmission information, and the first end node cancels transmission of the first data.

The first time information may be a time point (corresponding to absolute time), or may be duration (corresponding to relative time). For example, the first time information is a time point (namely, a moment) that is estimated by the first end node and at which the first data is sent to the second end node. For another example, the first time information is duration. The duration is duration between a moment at which the second end node receives the delayed transmission information (corresponding to a moment at which the first end node sends the delayed transmission information) and a moment at which the first end node sends the first data to the second end node. The target time may be a time point that is determined based on the first time information and at which the first data is sent to the second end node. That the first end node determines that the second end node accepts the delayed transmission information may be understood as that the first end node determines that the second end node allows the first end node to send the first data to the second end node. That the first end node determines that the second end node refuses the delayed transmission information may be understood as that the first end node determines that the second end node refuses to allow the first end node to send the first data to the second end node. That the first end node determines whether the second end node accepts or refuses may be as follows: The first end node determines, according to a preset interaction policy, whether the second end node accepts or refuses the transmission delay information, for example, may be as follows: If a refusal message sent by the second end node is received, it is considered that the transmission delay information is refused; or if a notification message sent by the second end node is received to notify the reception or explicitly notify acceptance of the reception, it is considered that the transmission delay information is accepted. Alternatively, another policy may be used. For example, if no response message from the second end node is received in preset time, it is considered that the second end node accepts the transmission delay information; or if no response message from the second end node is received in preset time, it is considered that the second end node refuses the transmission delay information. A policy may set, according to implementation of a solution, a judgment logic for the first end node to determine whether the second end node accepts or refuses. When determining that the second end node does not allow the first end node to send the first data, the first end node cancels transmission of the first data, so that redundant transmission of data can be reduced. When determining that the second end node allows the first end node to send the first data, the first end node delays sending the first data to the second end node, so that a load can be reduced, and resource usage can be improved.

In some embodiments of this application, when determining that the second end node accepts the delayed transmission information, the first end node sends the first data to the second end node at the target time, so that a load can be reduced. When determining that the second end node refuses the delayed transmission information, the first end node cancels transmission of the first data, so that redundant transmission of data can be reduced, and a load of the first end node can be reduced.

In some embodiments, before the first end node cancels transmission of the first data, the method further includes: The first end node creates a sending task of sending the first data to the second end node. That the first end node cancels transmission of the first data includes: The first end node cancels the sending task.

That the first end node cancels the sending task may be that the first end node deletes the sending task. In some embodiments, after receiving a data request from the second end node, the first end node creates the sending task of sending the first data to the second end node. The data request is used to obtain the first data. In other words, after receiving a data request from the second end node, the first end node creates a sending task of sending data requested by the data request to the second end node. When determining that the second end node refuses the delayed transmission information, the first end node cancels the sending task. The delayed transmission information indicates time information at which the first end node sends the data requested by the data request to the second end node. In some embodiments, after receiving the data request, the first end node creates the sending task of sending the data requested by the data request. If determining not to send the data requested by the data request, the first end node deletes the sending task. Otherwise, the first end node executes the sending task (of sending the data requested by the data request). It should be understood that in some embodiments, once receiving the data request, the first end node creates the sending task of sending the data requested by the data request. In other words, when receiving the data request, the first end node creates, by default, the sending task of sending the data requested by the data request. In some embodiments, after receiving the data request, the first end node creates the sending task of sending the data requested by the data request, instead of creating the sending task before sending the data, so that data can be sent more quickly.

In some embodiments, that the first end node cancels transmission of the first data includes: The first end node skips creating the sending task of sending the first data to the second end node.

In some embodiments, after determining that the second end node accepts the delayed transmission information, the first end node creates and executes the sending task of sending the first data to the second end node. After determining that the second end node refuses the delayed transmission information, the first end node skips creating the sending task of sending the first data to the second end node. In other words, the first end node creates the sending task of sending the data only after determining to send the data (corresponding to accepting the delayed transmission information). In this way, operations of creating the sending task can be reduced.

In some embodiments, when the first end node determines that the second end node refuses the delayed transmission information, the first end node skips creating the sending task of sending the first data to the second end node, so that operations of creating the sending task can be reduced.

In some embodiments, that the first end node determines that the second end node accepts the delayed transmission information includes: The first end node receives a first message from the second end node, where the first message is sent by the second end node after the delayed transmission information is received, the first message includes first indication information, and the first indication information indicates that the second end node allows the first end node to send the first data. It should be understood that the first indication information may be content for explicitly indicating to allow the first end node to send the first data, and the first indication information may be another agreed indication message for indicating to allow. For example, the first indication message may be an acknowledgment reception message. When the first message received by the first end node includes a message for indicating that the delayed transmission information is received, it is considered that the second end node allows the first end node to send the first data.

The first message may be an acknowledgment message, for example, an acknowledgment (ACK) character, where the acknowledgment message indicates that the delayed transmission information is accepted; or may be an allow message, where the allow message indicates to allow the first end node to send the first data, for example, a message agreed between the end nodes; or may be an indication message of another type for indicating the first end node to send the first data, for example, an indication message including content such as acknowledgment sending time of the first data and an identifier of the second end node. The acknowledgment sending time of the first data may be time that is indicated by the second end node and at which the first end node sends the first data.

In some embodiments, the first end node may quickly and accurately determine, based on the first message, that the second end node accepts the delayed transmission information.

In some embodiments, that the first end node determines that the second end node accepts the delayed transmission information includes: If the first end node does not receive a third message from the second end node in first duration after sending the delayed transmission information, the first end node determines that the second end node accepts the delayed transmission information, where the third information includes third indication information, and the third indication information indicates that the second end node refuses to allow the first end node to send the first data.

The third message may be a negative acknowledgment message, for example, a negative acknowledgment character (NACK), where the negative acknowledgment message indicates that the delayed transmission information is refused; or may be a refusal message, where the refusal message indicates to refuse to allow the first end node to send the first data, for example, a message agreed between the end nodes; or may be an indication message of another type for indicating the first end node not to send the first data, for example, an indication message including content such as an identifier of the delayed transmission information and an identifier of the second end node. It should be understood that the third message may include content for indicating that the second end node refuses to allow the first end node to send the first data. The third message may alternatively be a message agreed between the end nodes. In other words, the third message does not need to explicitly include the content of refusing to allow the first end node to send the first data.

In some embodiments, the first end node can determine that the second end node accepts the delayed transmission information without a message sent by the second end node, so that signaling consumption can be reduced and implementation is simple.

In some embodiments, that the first end node determines that the second end node refuses the delayed transmission information includes: The first end node receives a second message from the second end node, where the second message is sent by the second end node after the delayed transmission information is received, the second message includes second indication information, and the second indication information indicates that the second end node refuses to allow the first end node to send the first data.

The second message may be a negative acknowledgment message, for example, NACK, where the negative acknowledgment message indicates that the delayed transmission information is refused; or may be a refusal message, where the refusal message indicates to refuse to allow the first end node to send the first data, for example, a message agreed between the end nodes; or may be an indication message of another type for indicating the first end node not to send the first data, for example, an indication message including content such as an identifier of the delayed transmission information and an identifier of the second end node. It should be understood that the second indication information in the second message may include content for indicating to refuse to allow the first end node to send the first data. The second indication information may alternatively be information content agreed between the end nodes. In other words, the second message does not need to explicitly include the content for indicating to refuse to allow the first end node to send the first data.

In some embodiments, the first end node may quickly and accurately determine, based on the second message, that the second end node refuses the delayed transmission information.

In some embodiments, that the first end node determines that the second end node refuses the delayed transmission information includes: If the first end node does not receive a fourth message from the second end node in second duration after sending the delayed transmission information, the first end node determines that the second end node refuses the delayed transmission information, where the fourth information includes fourth indication information, and the fourth indication information indicates that the second end node allows the first end node to send the first data.

The fourth message may be an acknowledgment message, for example, an ACK, where the acknowledgment message indicates that the delayed transmission information is accepted; or may be an allow message, where the allow message indicates to allow the first end node to send the first data, for example, a message agreed between the end nodes; or may be an indication message of another type for indicating the first end node to send the first data, for example, an indication message including content such as acknowledgment sending time of the first data and an identifier of the second end node. The acknowledgment sending time of the first data may be time that is indicated by the second end node and at which the first end node sends the first data.

In some embodiments, the first end node can determine that the second end node refuses the delayed transmission information without a message sent by the second end node, so that signaling consumption can be reduced.

In some embodiments, the delayed transmission information is a data credential, the data credential indicates the first time information at which the first end node sends the first data to the second end node, and the data credential is further used to verify an identity of the first end node.

The second end node may verify the identity of the first end node based on the data credential, to avoid interference from a malicious end node, so that security is improved. In some embodiments, the delayed transmission information is the data credential, and the data credential may be used to verify the identity of the first end node, so that data transmission security can be improved.

In some embodiments, before a first end node sends delayed transmission information to a second end node, the method further includes: The first end node determines first delay time information based on a load amount, where the first delay time information is obtained based on the load amount; and the first end node generates the delayed transmission information based on the first delay time information, where the first time information is obtained based on the first delay time information.

The load amount may be an amount of data currently to be sent by the first end node, for example, a data size of data in a sending queue. The first delay time information may be duration, or may be a time point. That the first end node determines first delay time information based on a load amount may be that the first end node estimates, based on the load amount, a time point at which the first data is sent, to obtain the first delay time information, where the first delay time information indicates the time point; or may be that the first end node calculates delay duration based on the load amount to obtain the first delay time information, where the first delay time information is the delay duration, namely, duration between a moment at which the first end node sends the first data and a current moment (namely, a moment at which the first delay time information is determined).

In some embodiments, the first delay time information may be accurately determined based on the load amount. In some embodiments, a calculation equation in which the first end node determines the first delay time information based on the load amount is as follows:

$$rt1 = \frac{\sum_{f \in Q_i} \text{size}(f) + \text{size}(f')}{UB_i} + D_{i,j}$$

Herein, rt1 is the first delay time information, i indicates the first end node, j indicates the second end node, f and f' are file resources of an end node i (namely, the first end node), size(f) is a data size of the first data, size(f') is a data size of a queue being processed by the first end node (namely, a current to-be-sent data size), $UB_i$ is a sending bandwidth of the end node i (namely, a bandwidth for sending data to another end node), and $D_{i,j}$ is a data transmission delay between the end node i and an end node j. Generally, this parameter has small impact, and may be an optional parameter. In some embodiments, the first delay time information may be accurately calculated.

In some embodiments, that the first end node determines first delay time information based on a load amount includes: If the first end node stores the first data and the load amount is greater than a load threshold, the first end node determines the first delay time information based on the load amount.

In some embodiments, when the load amount is greater than the load threshold, sending the first data is delayed, so that a load can be effectively reduced.

In some embodiments, before a first end node sends delayed transmission information to a second end node, the method further includes: The first end node generates the delayed transmission information based on second time information, where the first time information is obtained based on the second time information, and the second time information is estimated time information at which the first end node obtains the first data.

The second time information may be time that is estimated by the first end node and at which the first data is received from another end node. For example, when the first end node receives time information that is sent by an end node and that indicates to send the first data to the first end node, the first end node may estimate, based on the time information, the second time information at which the first data is received from the end node. That the first end node generates the delayed transmission information based on second time information may be: The first end node determines second delay time information based on the second time information; and the first end node generates the delayed transmission information based on the second delay time information, where the first time information is obtained based on the second delay time information.

If the first end node does not store the first data, the first end node determines the second delay time information based on the second time information. The second time information may be a time point that is estimated (or obtained) by the first end node and at which the first end node obtains the first data, or may be duration between an estimated (or obtained) current moment and a moment at which the first end node receives the first data. The second delay time information may be a time point that is estimated (or calculated) by the first end node based on the second time information and at which the first data is sent, or may be delay duration that is estimated (or calculated) by the first end node based on the second time information and for which the first data is sent, namely, duration between a moment at which the first end node sends the first data and a current moment.

In some embodiments, the first end node may accurately estimate, based on the second time information, the time at which the first data is sent.

In some embodiments, a calculation equation in which the first end node determines the second delay time information based on the second time information is as follows:

$$rt2 = \frac{\sum_{f \in Q_i} \text{size}(f) + \text{size}(f')}{UB_i} + D_{i,j} + rt[i-1]$$

Herein, rt2 is the second delay time information, rt[i−1] is duration between the estimated current moment and the moment at which the first end node obtains the first data, i indicates the first end node, j indicates the second end node, f and f' are file resources of an end node i, size(f) is a data size of the first data, size(f') is a data size of a queue being processed by the first end node, $UB_i$ is a sending bandwidth of the end node i, and $D_{i,j}$ is a data transmission delay between the end node i and an end node j. Generally, this parameter has small impact, and may be an optional parameter. It should be understood that rt[i−1] may be understood as duration between a moment at which the first end node determines the second delay time information and a moment at which the first end node receives the first data.

In some embodiments, both the moment at which the first data is obtained and the current load are considered, so that the second delay time information can be accurately calculated.

In some embodiments, the method further includes: The first end node receives a data request for obtaining second data; and if the first end node does not store the second data and does not obtain the second data, the first end node refuses the data request.

The refusing the data request may be ignoring the data request, namely, performing no operation on the data request; or may be sending, to an end node that sends the data request, indication information indicating that the first end node refuses the data request.

In some embodiments, if the first end node does not store the second data and does not obtain the second data, the first end node refuses the data request.

In some embodiments, the case of not storing the second data and not obtaining the second data includes: not storing the second data and not storing a first data credential. The first data credential is other than a credential for any end node to send the second data to the first end node.

In some embodiments, whether the second data is obtained can be accurately and quickly determined.

In some embodiments, the first end node starts to monitor, at reference time, whether a condition for sending the first data to the second end node is met, where the reference time is a time point that is indicated by the delayed transmission information and at which the first end node sends the first data to the second end node. If the first end node meets the condition for sending the first data to the second end node, the first end node sends the first data to the second end node at the reference time (corresponding to the target time). If the first end node does not meet the condition for sending the first data to the second end node, the first end node continues to monitor whether the first end node meets the condition for sending the first data to the second end node. When the first end node meets the condition for sending the first data to the second end node (corresponding to the target time), the first end node sends the first data to the second end node. For example, when the first end node reaches the reference time (a time point), an end node load of the first end node starts to be monitored. At the target time at which the end node load of the first end node is less than the load threshold, the first data starts to be sent to the first end node.

To avoid that the first end node does not meet the condition for sending the first data to the second end node at the reference time, the first end node may send the first data to the second end node when meeting the condition for sending the first data to the second end node, so that data transmission reliability can be ensured.

In some embodiments, this application provides a data transmission method. The method includes: A second end node sends a first message, where the first message is sent after delayed transmission information is received, the delayed transmission message is sent by a first end node, the delayed transmission information indicates first time information at which the first end node sends the first data to the second end node, the first message includes first indication information, and the first indication information indicates that the second end node allows the first end node to send the first data; or the second end node sends a second message, where the second message is sent after delayed transmission information is received, the second message includes second indication information, and the second indication information indicates that the second end node refuses to allow the first end node to send the first data.

The first message may be an acknowledgment message, for example, ACK, where the acknowledgment message indicates that the delayed transmission information is accepted; or may be an allow message, where the allow message indicates to allow the first end node to send the first data, for example, a message agreed between the end nodes; or may be an indication message of another type for indicating the first end node to send the first data, for example, an indication message including content such as acknowledgment sending time of the first data and an identifier of the second end node. The acknowledgment sending time of the first data may be time that is indicated by the second end node and at which the first end node sends the first data.

The second message may be a negative acknowledgment message, for example, NACK, where the negative acknowledgment message indicates that the delayed transmission information is refused; or may be a refusal message, where the refusal message indicates to refuse to allow the first end node to send the first data, for example, a message agreed between the end nodes; or may be an indication message of another type for indicating the first end node not to send the first data, for example, an indication message including content such as an identifier of the delayed transmission information and an identifier of the second end node. It should be understood that the second message may include content for indicating to refuse to allow the first end node to send the first data. The second message may alternatively be a message agreed between the end nodes. In other words, the second message does not need to explicitly include the content of refusing to allow the first end node to send the first data.

It should be understood that when determining, based on the delayed transmission information, that the first end node cannot provide the first data in a timely manner, the second end node sends the second message, to avoid that the first end node sends data to the second end node, so that redundant transmission of data can be reduced. When determining, based on the delayed transmission information, that the first end node can provide the first data in a timely manner, the second end node sends the first message, so that the first data can be quickly obtained, and data obtaining efficiency is high.

In some embodiments of this application, the second end node sends the first message based on the delayed transmission information, so that required data can be quickly obtained. The second end node sends the second message based on the delayed transmission information, so that redundant transmission of data can be reduced.

In some embodiments, the delayed transmission information is a data credential, the data credential indicates the first time information at which the first end node sends the first data to the second end node, and the data credential is further used to verify an identity of the first end node.

In some embodiments, the second end node may verify the identity of the first end node based on the data credential, so that security is improved.

In some embodiments, before a second end node sends a first message, the method further includes: When a credit value of the first end node is greater than a credit value of a third end node, the second end node determines to send the first message, where the third end node is an end node allowed by the second end node to send the first data to the second end node.

The first end node may allow one or more end nodes to send the first data to the first end node. For example, after the second end node allows an end node to send the first data to the second end node, the second end node may continue to allow another end node to send the first data to the second end node. In some embodiments, if the second end node has allowed at least one end node (for example, the third end node) to send the first data to the second end node, the second end node may determine, based on the credit value of the first end node and a credit value of the at least one end node, whether to send the first message, that is, whether to allow the first end node to send the first data to the second end node. In some embodiments, after determining to send the first message, the second end node sends a fifth message to the third end node, where the fifth message includes third indication information, and the third indication information indicates that the second end node refuses to allow the third end node to send the first data, to avoid that the third end node sends the first data. It should be understood that the second end node may not notify the third end node to cancel transmitting the first data. In other words, the second end node does not send the fifth message to the third end node. In some embodiments, after determining to send the first message, the second end node waits for the first end node to send the first data to the second end node, and does not wait for the third end node to send the first data to the second end node. It is equivalent that the second end node allows only the first end node to send the first data to the second end node.

A larger credit value of an end node indicates a higher probability that the end node sends data as agreed. In some embodiments, the second end node may compare the credit value of the first end node with the credit value of the third end node. When the credit value of the first end node is greater than the credit value of the third end node, the second end node determines to send the first message. In other words, the second end node may determine whether to send the first message only by determining whether the credit value of the first end node is greater than the credit value of the third end node. When the credit value of the first end node is greater than the credit value of the third end node, that the second end node determines to send the first message may be understood as that the second end node allows the first end node with a higher credit value to send the first data to the second end node, to improve a probability of obtaining the first data.

In some embodiments, before a second end node sends a first message, the method further includes: When a credit value of the first end node is greater than a credit value of a third end node, and a difference between the credit value of the first end node and the credit value of the third end node is greater than a credit threshold, the second end node determines to send the first message, where the third end node is an end node allowed by the second end node to send the first data to the second end node.

The credit threshold may be a real number greater than 0, and may be set based on an actual situation. The second end node may first determine whether the credit value of the first end node is greater than the credit value of the third end node; and when the credit value of the first end node is greater than the credit value of the third end node, determine whether the difference between the credit value of the first end node and the credit value of the third end node is greater than the credit threshold. The second end node may determine whether the difference between the credit value of the first end node and the credit value of the third end node is greater than the credit threshold, and if yes, determine to send the first message. The difference between the credit value of the first end node and the credit value of the third end node is a credit value obtained by subtracting the credit value of the third end node from the credit value of the first end node. The second end node may first determine whether an absolute value of the difference between the credit value of the first end node and the credit value of the third end node is greater than the credit threshold; if yes, determine whether the credit value of the first end node is greater than the credit value of the third end node; and when the credit value of the first end node is greater than the credit value of the third end node, determine to send the first message. It should be understood that a processing mechanism of the second end node may be: first comparing the credit value of the first end node and the credit value of the third end node, and then determining the difference between the two credit values; or first determining the difference between the two credit values, and then comparing the two credit values.

In some embodiments, the first end node selects an end node with a higher credit value to send the first data to the second end node, so that reliability of obtaining the first data can be improved.

In some embodiments, before a second end node sends a first message, the method further includes: The second end node determines to send the first message when first time is earlier than second time, where the first time is time at which the first end node sends the first data to the second end node, the second time is time at which a fourth end node sends the first data to the second end node, and the fourth end node is an end node allowed by the second end node to send the first data to the second end node. The fourth end node may be the third end node, or may be another end node.

The first time may be obtained by the second end node based on the first time information. The second time may be obtained based on third time information. The third time information is from the fourth end node and indicates time information at which the fourth end node sends the first data to the second end node. For example, the second end node receives first delayed transmission information from the fourth end node. The first delayed transmission information indicates the third time information at which the fourth end node sends the first data to the second end node. The second end node obtains the second time based on the third time information. It should be understood that manners in which the second end node obtains the first time and the second time are similar. After the second end node allows the fourth end node to send the first data to the second end node, when the first time at which the first end node sends the first data to the second end node is earlier than the second time at which the fourth end node sends the first data to the second end node, the second end node determines to send the first message (namely, allow the first end node to send the first data to the second end node), so that the first data can be received more quickly.

In some embodiments, that the second end node determines to send the first message when first time is earlier than second time includes: When an absolute value of a difference between the credit value of the first end node and a credit value of a fourth end node is less than the credit threshold, and the first time is earlier than the second time, determining to send the first message.

The second end node may first determine whether the first time is earlier than the second time, and then determine whether the absolute value of the difference between the credit value of the first end node and the credit value of the fourth end node is less than the credit threshold; or may first determine whether the absolute value of the difference between the credit value of the first end node and the credit value of the fourth end node is less than the credit threshold, and then determine whether the first time is earlier than the second time.

In some embodiments, when the absolute value of the difference between the credit value of the first end node and the credit value of the fourth end node is less than the credit threshold, the second end node determines to accept the first end node with earlier sending time, so that the required first data can be obtained more quickly.

In some embodiments, before the determining to send the first message when the absolute value of the difference between the credit value of the first end node and the credit value of the fourth end node is less than the credit threshold, and the first time is earlier than the second time, the method further includes: If the second end node stores a data credential for the fourth end node to send the first data to the second end node, the second end node obtains the credit value of the fourth end node.

It should be understood that, if the second end node does not store a data credential for any end node to send the first data to the second end node, the second end node may directly allow the first end node to send the first data to the second end node, and does not need to obtain a credit value of the any end node. The second end node queries whether the credential for sending the first data to the second end node is stored, so that an operation of obtaining the credit value of the end node can be reduced.

In some embodiments, before a second end node sends a first message, the method further includes: If the second end node does not store a credential for any end node to send the first data to the second end node, the second end node determines to send the first message.

In some embodiments, the second end node may notify, in a timely manner, the first end node to send the first data to the second end node.

In some embodiments, before a second end node sends a second message, the method further includes: When a credit value of the first end node is not greater than a credit value of a fifth end node, the second end node determines to send the second message, where the fifth end node is an end node allowed by the second end node to send the first data to the second end node.

In some embodiments, the first end node selects an end node with a higher credit value to send the first data to the second end node, so that reliability of obtaining the first data can be improved.

In some embodiments, before a second end node sends a second message, the method further includes: When the credit value of the first end node is not greater than the credit value of the fifth end node, and an absolute value of a difference between the credit value of the first end node and the credit value of the third end node is greater than the credit threshold, the second end node determines to send the second message, where the fifth end node is an end node allowed by the second end node to send the first data to the second end node.

The credit threshold may be a real number greater than 0, and may be set based on an actual situation. The second end node may first determine whether the credit value of the first end node is not greater than the credit value of the fifth end node; and when the credit value of the first end node is not greater than the credit value of the fifth end node, determine whether the absolute value of the difference between the credit value of the first end node and the credit value of the fifth end node is greater than the credit threshold. The second end node may first determine whether the absolute value of the difference between the credit value of the first end node and the credit value of the fifth end node is greater than the credit threshold; if yes, determine whether the credit value of the first end node is not greater than the credit value of the fifth end node; and when the credit value of the first end node is not greater than the credit value of the fifth end node, determine to send the first message. It should be understood that a processing mechanism of the second end node may be: first comparing the credit value of the first end node and the credit value of the fifth end node, and then determining the difference between the two credit values; or first determining the difference between the two credit values, and then comparing the two credit values.

In some embodiments, before a second end node sends a second message, the method further includes: determining to send the second message when first time is not earlier than third time, where the first time is time at which the first end node sends the first data to the second end node, the third time is time at which a sixth end node sends the first data to the second end node, and the sixth end node is an end node allowed by the second end node to send the first data to the second end node.

The first time may be obtained by the second end node based on the first time information. The fourth time may be obtained based on fourth time information. The fourth time information is from the sixth end node and indicates time information at which the sixth end node sends the first data to the second end node. For example, the second end node receives second delayed transmission information from the sixth end node. The second delayed transmission information indicates the fourth time information at which the sixth end node sends the first data to the second end node. The second end node obtains the third time based on the fourth time information. It should be understood that manners in which the second end node obtains the first time and the third time are similar.

It may be understood that, that first time is not earlier than third time indicates that time at which the first end node sends the first data to the second end node is later than time at which the sixth end node sends the first data to the second end node, and the second end node determines to send the second message, so that redundant transmission of data can be avoided.

In some embodiments, the determining to send the second message when first time is not earlier than third time includes: When an absolute value of a difference between the credit value of the first end node and a credit value of a sixth end node is less than the credit threshold, and the first time is not earlier than the third time, determining to send the second message.

The second end node may first determine whether the first time is earlier than the third time, and then determine whether the absolute value of the difference between the credit value of the first end node and the credit value of the sixth end node is less than the credit threshold; or may first determine whether the absolute value of the difference between the credit value of the first end node and the credit value of the sixth end node is less than the credit threshold, and then determine whether the first time is earlier than the third time.

In some embodiments, the second end node may more quickly receive the first data.

In some embodiments, after the second end node receives the delayed transmission information from the first end node, the method further includes: If the second end node receives the first data from the first end node in a target time period, increasing the credit value of the first end node, where the target time period is obtained based on the first time information; or if the second end node does not receive the first data from the first end node in a target time period, decreasing the credit value of the first end node.

Start time of the target time period may be earliest time that is estimated by the second end node based on the first time information and at which the first data from the first end node is received. End time of the target time period may be latest time that is estimated by the second end node based on the first time information and at which the first data from the first end node is received. For example, the first time information is a time point at which the first end node sends the first data to the second end node. The start time of the target time period is the time point. The end time of the target time period is a time point that is specific duration (which may be set based on an actual scenario, for example, 100 ms) after the time point. If the second end node receives the first data from the first end node in the target time period, the second end node considers that the first end node sends the first data to the second end node at agreed time. Therefore, the credit value of the first end node can be increased. If the second end node does not receive the first data from the first end node in the target time period, the second end node considers that the first end node does not send the first data to the second end node at agreed time. Therefore, the credit value of the first end node can be decreased.

In some embodiments, the second end node updates the credit value of the first end node according to whether the first end node provides data to the second end node in a timely manner, so that the second end node can update the credit value of the first end node in a timely manner and accurately.

In some embodiments, the credit value of the first end node satisfies the following equation:

$$\mathrm{credit}=1/(1+\exp(\theta-2\theta r))$$

Herein, credit indicates the credit value of the first end node (corresponding to a requested end node), and $\theta$ is a value that is set based on an actual requirement, for example, 8 by default, so that a value range of credit is between 0 and 1; and r is a proportion of a quantity of times that the first end node fulfills a protocol, namely, a proportion of a quantity of times that the first end node sends data to the second end node at agreed time (namely, on time) in a quantity of times that the second end node accepts the data credential (corresponding to the delayed transmission information) of the first end node. During actual application, the second end node may update r in a timely manner, to update the credit value of the first end node in a timely manner. It should be understood that, if the second end node receives the first data from the first end node in the target time period, it indicates that the quantity of times that the first end node sends data to the second end node at agreed time (namely, on time) increases (corresponding to an increase of r). Therefore, the first end node may update the credit value of the first end node according to the foregoing equation, that is, increase the credit value of the first end node. If the second end node does not receive the first data from the first end node in the target time period, it indicates that a quantity of times that the first end node does not send data to the second end node at agreed time (namely, on time) increases (corresponding to a decrease of r). Therefore, the first end node may update the credit value of the first end node according to the foregoing equation, that is, decrease the credit value of the first end node.

The proportion that the first end node fulfills a protocol satisfies the following equation:

$$r=(n_{success}+1)/(n_{total}+1)$$

Herein, $n_{total}$ is the quantity of times that the second end node accepts the data credential (corresponding to the delayed transmission information) of the first end node, and $n_{success}$ is a quantity of times that the first end node sends data at agreed time and that is recorded by the second end node.

In some embodiments, the second end node updates the credit value of the first end node according to whether the first end node sends data at agreed time, so that the data is obtained more quickly based on the credit value of the first end node subsequently.

In some embodiments, this application provides a communication apparatus. The apparatus includes: a transceiver module, configured to send delayed transmission information to a second end node, where the delayed transmission information indicates first time information at which a first end node sends first data to the second end node; and a processing module, configured to determine that the second end node accepts the delayed transmission information. The processing module is further configured to send the first data to the second end node at target time based on the first time information by using the transceiver module, where the target time is determined based on the first time information; or the processing module is configured to determine that the second end node refuses the delayed transmission information, and cancel transmitting the first data.

In some embodiments, the processing module is further configured to create a sending task of sending the first data to the second end node. The processing module is configured to cancel the sending task.

In some embodiments, the processing module is configured to skip creating a sending task of sending the first data to the second end node.

In some embodiments, the processing module is configured to: if the transceiver module receives a first message from the second end node, determine that the second end node accepts the delayed transmission information, where the first message is sent by the second end node after the delayed transmission information is received, the first message includes first indication information, and the first indication information indicates that the second end node allows the first end node to send the first data.

In some embodiments, the processing module is configured to: if the transceiver module does not receive a third message from the second end node in first duration after the transceiver module sends the delayed transmission information, determine that the second end node accepts the delayed transmission information, where the third information includes third indication information, and the third indication information indicates that the second end node refuses to allow the first end node to send the first data.

In some embodiments, the processing module is configured to: if the transceiver module receives a second message from the second end node, determine that the second end node refuses the delayed transmission information, where the second message is sent by the second end node after the delayed transmission information is received, the second message includes second indication information, and the second indication information indicates that the second end node refuses to allow the first end node to send the first data.

In some embodiments, the processing module is configured to: if the transceiver module does not receive a fourth message from the second end node in second duration after the transceiver module sends the delayed transmission information, determine that the second end node refuses the delayed transmission information, where the fourth information includes fourth indication information, and the fourth indication information indicates that the second end node allows the first end node to send the first data.

In some embodiments, the delayed transmission information is a data credential, the data credential indicates the first time information at which the first end node sends the first data to the second end node, and the data credential is further used to verify an identity of the first end node.

In some embodiments, the processing module is further configured to: determine first delay time information based on a load amount; and generate the delayed transmission information based on the first delay time information, where the first time information is obtained based on the first delay time information, and the first delay time information is obtained based on the load amount.

In some embodiments, a calculation equation in which the processing module determines the first delay time information based on the load amount is as follows:

$$rt1 = \frac{\sum_{f \in Q_i} \text{size}(f) + \text{size}(f')}{UB_i} + D_{i,j}$$

Herein, rt1 is the first delay time information, i indicates the first end node, j indicates the second end node, f and f' are file resources of an end node i (namely, the first end node), size(f) is a data size of the first data, size(f') is a data size of a queue being processed by the first end node (namely, a current to-be-sent data size), $UB_i$ is a sending bandwidth of the end node i (namely, a bandwidth for sending data to another end node), and $D_{i,j}$ is a data transmission delay between the end node i and an end node j. Generally, this parameter has small impact, and may be an optional parameter.

In some embodiments, the processing module is configured to: if the first end node stores the first data and the load amount is greater than a load threshold, determine the first delay time information based on the load amount.

In some embodiments, the processing module is further configured to generate the delayed transmission information based on second time information, where the first time information is obtained based on the second time information, and the second time information is estimated time information at which the first end node obtains the first data.

In some embodiments, the processing module is configured to: determine second delay time information based on the second time information; and generate the delayed transmission information based on the second delay time information, where the first time information is obtained based on the second delay time information.

In some embodiments, a calculation equation in which the processing module determines the second delay time information based on the second time information is as follows:

$$rt2 = \frac{\sum_{f \in Q_i} \text{size}(f) + \text{size}(f')}{UB_i} + D_{i,j} + rt[i-1]$$

Herein, rt2 is the second delay time information, rt[i−1] is duration between the estimated current moment and the moment at which the first end node obtains the first data, i indicates the first end node, j indicates the second end node, f and f' are file resources of an end node i, size(f) is a data size of the first data, size(f') is a data size of a queue being processed by the first end node, $UB_i$ is a sending bandwidth of the end node i, and $D_{i,j}$ is a data transmission delay between the end node i and an end node j. Generally, this parameter has small impact, and may be an optional parameter.

In some embodiments, the transceiver module is further configured to receive a data request for obtaining second data. The processing module is further configured to: in a case of not storing the second data and not obtaining the second data, refuse the data request.

In some embodiments, the case of not storing the second data and not obtaining the second data includes: not storing the second data and not storing a first data credential. The first data credential is other than a credential for any end node to send the second data to the first end node.

In some embodiments, this application provides a communication apparatus. The apparatus includes: a transceiver module, configured to receive delayed transmission information from a first end node, where the delayed transmission information indicates first time information at which the first end node sends first data to a second end node. The transceiver module is further configured to send a first message generated by a processing module, where the first message is sent after the delayed transmission information is received, the first message includes first indication information, and the first indication information indicates that the second end node allows the first end node to send the first data; or the transceiver module is further configured to send a second message generated by a processing module, where the second message is sent after the delayed transmission information is received, the second message includes second indication information, and the second indication information indicates that the second end node refuses to allow the first end node to send the first data.

In some embodiments, the delayed transmission information is a data credential, the data credential indicates the first time information at which the first end node sends the first data to the second end node, and the data credential is further used to verify an identity of the first end node.

In some embodiments, the processing module is further configured to: when a credit value of the first end node is greater than a credit value of a third end node, determine to send the first message, where the third end node is an end node allowed by the second end node to send the first data to the second end node.

In some embodiments, the processing module is further configured to: when the credit value of the first end node is greater than the credit value of the third end node, and a difference between the credit value of the first end node and the credit value of the third end node is greater than a credit threshold, determine to send the first message, where the third end node is an end node allowed by the second end node to send the first data to the second end node.

In some embodiments, the processing module is further configured to determine to send the first message when first time is earlier than second time, where the first time is time at which the first end node sends the first data to the second end node, the second time is time at which a fourth end node sends the first data to the second end node, and the fourth end node is an end node allowed by the second end node to send the first data to the second end node.

In some embodiments, the processing module is configured to: when an absolute value of a difference between the credit value of the first end node and a credit value of the fourth end node is less than the credit threshold, and the first time is earlier than the second time, determine to send the first message.

In some embodiments, the processing module is further configured to: if a data credential for the fourth end node to send the first data to the second end node is stored, obtain the credit value of the fourth end node.

In some embodiments, the processing module is further configured to: if a credential for any end node to send the first data to the second end node is not stored, determine to send the first message.

In some embodiments, the processing module is further configured to: when the credit value of the first end node is not greater than a credit value of a fifth end node, determine to send the second message, where the fifth end node is an end node allowed by the second end node to send the first data to the second end node.

In some embodiments, the processing module is further configured to: when the credit value of the first end node is not greater than the credit value of the fifth end node, and an absolute value of a difference between the credit value of the first end node and the credit value of the third end node is greater than the credit threshold, determine, by the second end node, to send the second message, where the fifth end node is an end node allowed by the second end node to send the first data to the second end node.

In some embodiments, the processing module is further configured to determine to send the second message when first time is not earlier than third time, where the first time is time at which the first end node sends the first data to the second end node, the third time is time at which a sixth end node sends the first data to the second end node, and the sixth end node is an end node allowed by the second end node to send the first data to the second end node.

In some embodiments, the processing module is configured to: when an absolute value of a difference between the credit value of the first end node and a credit value of the sixth end node is less than the credit threshold, and the first time is not earlier than the third time, determine to send the second message.

In some embodiments, the processing module is further configured to: if the first data from the first end node is received in a target time period, increase the credit value of the first end node, where the target time period is obtained based on the first time information; or if the first data from the first end node is not received in a target time period, decrease the credit value of the first end node.

In some embodiments, the credit value of the first end node satisfies the following equation:

$$credit=1/(1+\exp(\theta-2\theta r))$$

Herein, credit indicates the credit value of the first end node (corresponding to a requested end node), and $\theta$ is a value that is set based on an actual requirement, for example, 8 by default, so that a value range of credit is between 0 and 1; and r is a proportion of a quantity of times that the first end node fulfills a protocol, namely, a proportion of a quantity of times that the first end node sends data to the second end node at agreed time (namely, on time) in a quantity of times that the second end node accepts the data credential (corresponding to the delayed transmission information) of the first end node.

The proportion that the first end node fulfills a protocol satisfies the following equation:

$$r=(n_{success}+1)/(n_{total}+1)$$

Herein, $n_{total}$ is the quantity of times that the second end node accepts the data credential (corresponding to the delayed transmission information) of the first end node, and $n_{success}$ is a quantity of times that the first end node sends data at agreed time and that is recorded by the second end node.

In some embodiments, this application provides a communication apparatus. The communication apparatus includes a processor. The processor is configured to execute computer executable instructions stored in a memory, so that the communication apparatus performs the method according to embodiments discussed herein.

In some embodiments of this application, in a process of performing the foregoing method, a process of sending delayed transmission information (namely, a packet), first data, and a first message (collectively referred to as information below) in the foregoing method may be understood as a process of outputting information based on the instructions of the processor. When outputting the information, the processor outputs the information to a transceiver, so that the transceiver transmits the information. After the information is output by the processor, other processing may further need to be performed, and then the information arrives at the transceiver. Similarly, when the processor receives input information, the transceiver receives the information, and inputs the information into the processor. Further, after the transceiver receives the information, other processing may need to be performed on the information before the information is input into the processor.

According to the foregoing principle, for example, the sending delayed transmission information may be understood as outputting the delayed transmission information based on the instructions of the processor. For another example, the sending a first message may be understood as sending the first message based on the instructions of the processor.

Operations such as sending and/or receiving related to the processor may be generally understood as instruction output based on the processor, unless otherwise specified, or if the operations do not conflict with an actual function or internal logic of the processor in related descriptions.

In some embodiments, the processor may be a processor configured to perform these methods, or may be a processor, for example, a general-purpose processor, configured to execute computer instructions in the memory to perform these methods. For example, the processor may be further configured to execute a program stored in the memory. When the program is executed, the communication apparatus is enabled to perform the method according to embodiments discussed herein.

In some embodiments, the memory is located outside the communication apparatus. In some embodiments, the memory is located inside the communication apparatus. In some embodiments, the processor and the memory may alternatively be integrated into one device. In other words, the processor and the memory may alternatively be integrated together.

In some embodiments, the communication apparatus further includes a transceiver. The transceiver is configured to receive a packet, send a packet, or the like.

In some embodiments, this application provides a communication apparatus. The communication apparatus includes a processor. The processor may be configured to execute computer executable instructions stored in a memory, so that the communication apparatus performs the method according to embodiments discussed herein.

In some embodiments, the processor may be a processor specially configured to perform these methods, or may be a processor, for example, a general purpose processor, configured to execute computer instructions in the memory to perform these methods. For example, the processor may be further configured to execute a program stored in the memory. When the program is executed, the communication apparatus is enabled to perform the method according to embodiments discussed herein.

In some embodiments, the memory is located outside the communication apparatus. In some embodiments, the memory is located inside the communication apparatus. In some embodiments, the processor and the memory may alternatively be integrated into one device. In other words, the processor and the memory may alternatively be integrated together.

In some embodiments, the communication apparatus further includes a transceiver. The transceiver is configured to receive a packet or send a packet.

In some embodiments, this application provides a communication apparatus. The communication apparatus includes a processing circuit and an interface circuit. The interface circuit is configured to obtain data or output data. The processing circuit is configured to perform the corresponding method according to embodiments discussed herein.

In some embodiments, this application provides a communication apparatus. The communication apparatus includes a processing circuit and an interface circuit. The interface circuit is configured to obtain data or output data.

The processing circuit is configured to perform the corresponding method according to embodiments discussed herein.

In some embodiments, this application provides a computer-readable storage medium. The computer-readable storage medium is configured to store a computer program. When the computer program is run on a computer, the method according to embodiments discussed herein is performed.

In some embodiments, this application provides a computer program product. The computer program product includes a computer program or computer code. When the computer program product is run on a computer, the method according to embodiments discussed herein is performed.

In some embodiments, this application provides a computer program. When the computer program is run on a computer, the method according to embodiments discussed herein is performed.

In some embodiments, this application provides a communication system. The communication system includes a first end node (corresponding to a requested end node) and a second end node (corresponding to a requesting end node). The first end node may be configured to perform the method according to embodiments discussed herein, and the second end node may be configured to perform the method according embodiments discussed herein.

BRIEF DESCRIPTION OF DRAWINGS

To describe the technical solutions in embodiments of this application or in the background more clearly, the following briefly describes the accompanying drawings for describing embodiments of this application or the background.

FIG. 7 is a schematic diagram of an example of a packet format used for communication between a first end node and a second end node according to some embodiments of this application;

FIG. 8 is a flowchart of another data transmission method according to some embodiments of this application;

DESCRIPTION OF EMBODIMENTS

To make objectives, technical solutions, and advantages of this application clearer, the following further describes this application with reference to the accompanying drawings.

In the specification, claims, and the accompanying drawings of this application, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of operations or units is not limited to the listed operations or units, but may include an unlisted operation or unit, or may include another operation or unit inherent to the process, the method, the product, or the device.

An "embodiment" mentioned in this specification means that a particular feature, structure, or characteristic described with reference to some embodiments may be included in at least one embodiment of this application. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

In this application, "at least one (item)" means one or more, "a plurality of" means two or more, "at least two (items)" means two, three, or more, and "and/or" is used to describe an association relationship between associated objects and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items. For example, at least one (piece) of a, b, or c may represent: a, b, c, a and b, a and c, b and c, or a, b, and c.

The following describes in detail a network architecture in this application.

Figure 1A:
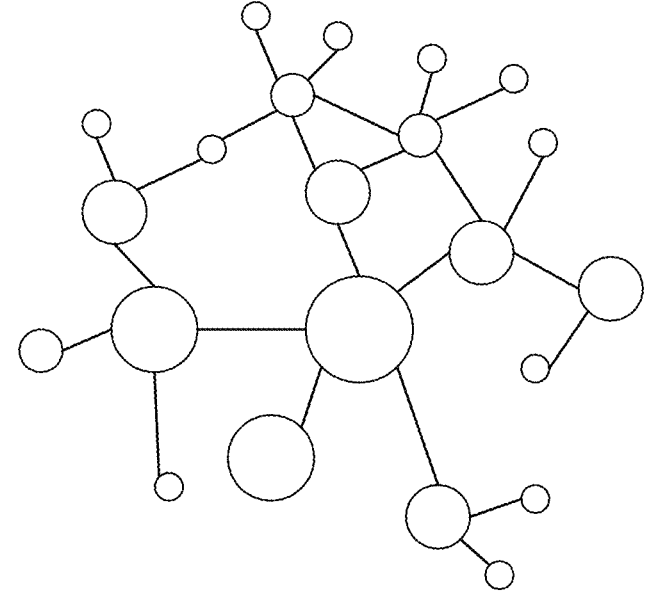
FIG. 1A is a schematic diagram of a distributed network according to some embodiments of this application.

FIG. 1A is a schematic diagram of a distributed network according to an embodiment of this application. Each circle in FIG. 1A indicates an end node, and a connection line between two end nodes indicates a communication link between the two end nodes. The distributed network in FIG. 1A may be a peer-to-peer P2P) network of centerless networking. Each end node may obtain a service (for example, obtain data) from another end node, or may provide a service (for example, send data) for another end node. The distributed network in FIG. 1A may be considered as a distributed storage architecture. The end node in FIG. 1A may be a device that has a data receiving and sending function and a data storage function, such as a mobile phone, a tablet computer, a desktop computer, a notebook computer, a smart television, a network attached storage (NAS), a smart home device, or a wearable device. In some embodiments, storage may be shared among all end nodes in FIG. 1A. Each end node is identified by using a unique end node peer identifier (PID) in the entire network, for example, a hash value based on an internet protocol (IP) address. Stored content data is identified by using a unique content identifier (CID) in the entire network, for example, obtained by hashing based on a content name/file name.

In the future, a mobile internet architecture will focus on a friend circle established based on actual social connections. For example, family members appear in a same home network, colleagues work in a same company, tourists travel in a same place, and friends are interested in a same topic. The centerless architecture network based on the interaction between people in the friend circle will become a trend. The application scenarios include MeeTime, WeLink, and smart classroom. Therefore, it is important to study data transmission in the distributed network in FIG. 1A.

Figure 1B:
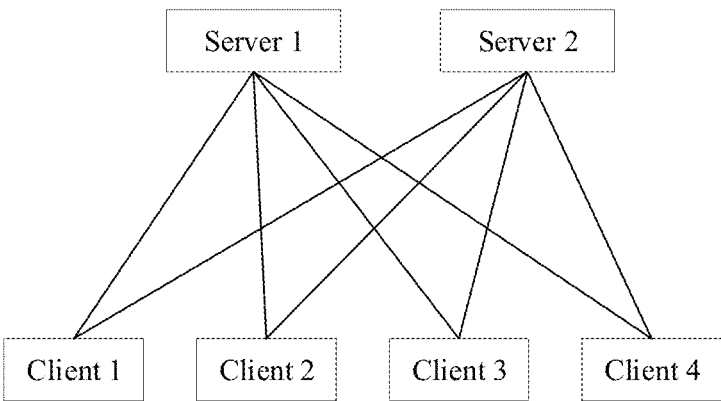
FIG. 1B is a schematic diagram of another distributed network according to some embodiments of this application.

FIG. 1B is a schematic diagram of another distributed network according to an embodiment of this application. The distributed network in FIG. 1B uses a client/server (C/S) structure. The distributed network includes at least two end nodes serving as servers and a plurality of end nodes serving as clients. FIG. 1B shows only an example of two end nodes (a server 1 and a server 2) serving as servers and four end nodes (a client 1, a client 2, a client 3, and a client 4) serving as clients. In the distributed network in FIG. 1B, each client may request to obtain same content data from at least two servers. In some embodiments, the content data stored in the server is identified by a CID, for example, obtained by hashing based on a content name/file name. Each client (corresponding to an end node) is identified by a PID, for example, based on a hash value of an IP address. The client/server structure is a current mainstream network architecture. In the network architecture, when a large quantity of clients obtain data from the server at the same time, some clients need to wait for a long time. Therefore, a solution that can improve the efficiency of obtaining data by the clients needs to be studied. The distributed network in this application may be considered as a data distribution network.

The following describes some data transmission solutions in a distributed network with reference to accompanying drawings.

Solution 1: Data is transferred in a mesh pull manner. Each end node (corresponding to a requesting end node) initiates a data obtaining request to a neighboring end node. After the neighboring end node receives the data obtaining request, if the neighboring end node (corresponding to a data source end node) locally stores data requested by the data obtaining request, the neighboring end node returns the corresponding data to the requesting end node. In this application, if there is a communication link between two end nodes, the two end nodes are neighboring end nodes of each other. The data source end node is an end node that can provide the data requested by the requesting end node, namely, an end node that provides data for the requesting end node. The requesting end node is an end node that requests any data from another end node, namely, an end node that sends the data obtaining request. A requested end node is an end node that receives the data obtaining request of the requesting end node, namely, an end node that is requested. If a requested end node can provide, for a requesting end node, data requested by the requesting end node, for the requesting end node, the requested end node is a data source end node; or if a requested end node cannot provide data requested by a requesting end node, for the requesting end node, the requested end node is not a data source end node.

In the solution 1, the data source end node fairly processes data obtaining requests of all requesting end nodes, and sequentially sends corresponding content data to each requesting end node in a first input first output (FIFO) order.

Figure 2:
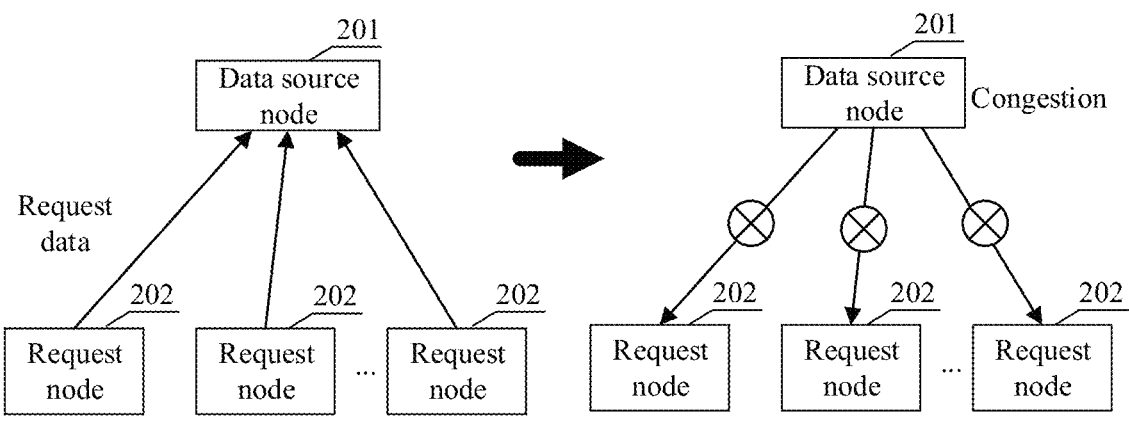
FIG. 2 is a schematic diagram of another distributed network according to some embodiments of this application.

In the solution 1, because a bandwidth or a data sending capability or both of a data source end node (for example, a mobile terminal) are limited, the data source end node is prone to congestion in a data sending process. It should be understood that, when the data source end node sends a large file (namely, a file with a large data size) to the requesting end node and/or receives a large quantity of data obtaining requests, because it takes an excessively long time for the data source end node to send data to some requesting end nodes, the data source end node is congested when sending data to other requesting end nodes. FIG. 2 is a schematic diagram of another distributed network according to an embodiment of this application. In FIG. 2, 201 indicates a data source end node, and 202 indicates a plurality of requesting end nodes (namely, end nodes that request data from the data source end node). A left diagram in FIG. 2 shows a scenario in which a plurality of requesting end nodes request data (corresponding to a large scale of data obtaining requests) from the data source end node, and a right diagram in FIG. 2 shows a scenario in which the data source end node is congested during sending.

In addition, in the solution 1, to ensure reliability, the requesting end node usually broadcasts a data obtaining request to neighboring end nodes. When a plurality of neighboring end nodes have data requested by the data obtaining request, the neighboring end nodes send the data to the requesting end node. It may be learned that the solution 1 causes redundant transmission and increases a network load.

Figure 3A:
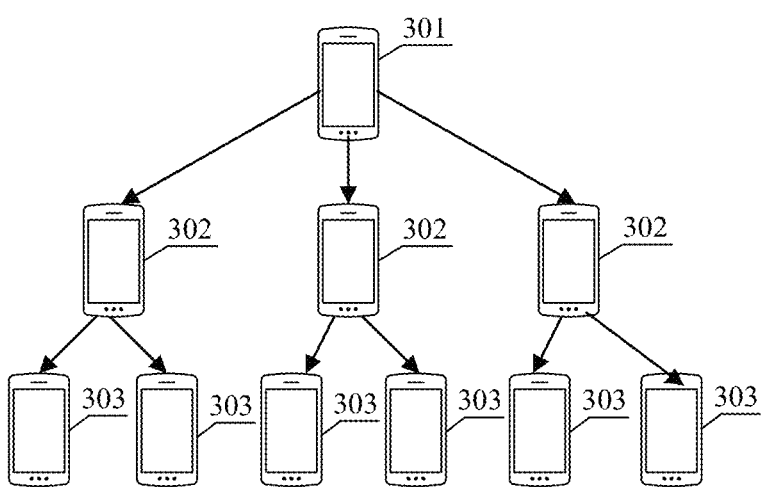
FIG. 3A is a schematic diagram of a data distribution network according to some embodiments of this application.
Figure 3B:
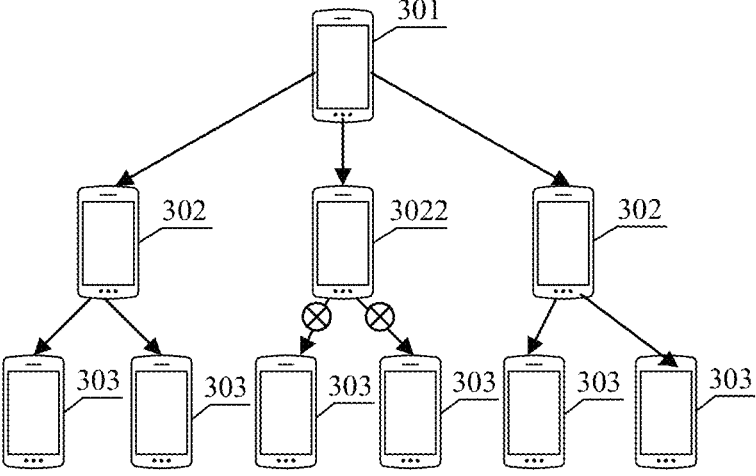
FIG. 3B is a schematic diagram of another data distribution network according to some embodiments of this application.

Solution 2: A data distribution tree is established in advance by using a newly released file (namely, content data) as an object. As shown in FIG. 3A, data is distributed according to the data distribution tree established in advance. FIG. 3A is a schematic diagram of a data distribution network according to an embodiment of this application. In FIG. 3A, the data distribution network includes a data source end node 301, a plurality of child end nodes 302 of the data source end node 301, and a plurality of child end nodes 303 of the plurality of child end nodes 302. Each child end node 302 indicates a child end node that obtains data from the data source end node 301 and that provides data for the child end node of the child end node 302 after obtaining the data from the data source end node 301. Each child end node 303 indicates a child end node that obtains data from the child end node 302. In FIG. 3A, the child end node 302 may be considered as a child end node of the end node 301. Any child end node 303 may be considered as a child end node of a child end node 302. In the solution 2, after any child end node 302 obtains data from the end node 301, the any child end node 302 may serve as a data source end node to provide data for a child end node (corresponding to the child end node 303) of the any child end node 302. It should be understood that in solution 2, a data transmission task is jointly completed by a plurality of end nodes, and the end node 301 does not need to process a large scale of data obtaining requests. Therefore, a network load can be balanced, and repeated requests and redundant transmission can be reduced. However, the solution 2 has a defect of poor invulnerability (namely, low reliability). Once an end node in the data distribution tree is faulty or is disconnected from the parent end node, the child end nodes connected to the end node cannot receive data, as shown in FIG. 3B. FIG. 3A may be considered as a data distribution tree. Each end node is an end node in the distribution tree. FIG. 3B is a schematic diagram of another data distribution network according to an embodiment of this application. FIG. 3B may be considered as a network formed after a child end node 3022 (any child end node 302) in FIG. 3A is faulty or is disconnected from the parent end node 301. As shown in FIG. 3B, after a child end node 3022 is faulty or is disconnected from the parent end node 301, the child end nodes connected to the data child end node 3022 cannot receive data. In addition, the solution 2 has a more obvious defect in a networking mode of a mobile device. Because each end node is connected and disconnected more frequently than a fixed end node, the parent end node in the tree is more likely to exit, and consequently, a child end node of the end node cannot receive data, or a tree structure needs to be frequently reconstructed, and consequently, network overheads are high.

This application provides a data transmission solution that has high reliability and that can avoid redundant transmission of data. A main principle of the data transmission solution provided in this application is as follows: The requested end node (corresponding to the first end node) may determine, based on a load of the requested end node, whether to delay sending data requested by a received data obtaining request, and when delaying sending the data requested by the received data obtaining request, estimate sending time (for example, estimated sending time) at which data is sent to the requesting end node, and the requesting end node selects to receive content data of an appropriate requested end node based on the received estimated sending time provided by each requested end node and a credit value stored or obtained by the requesting end node. The following describes the data transmission solutions provided in embodiments of this application with reference to the accompanying drawings.

Figure 4:
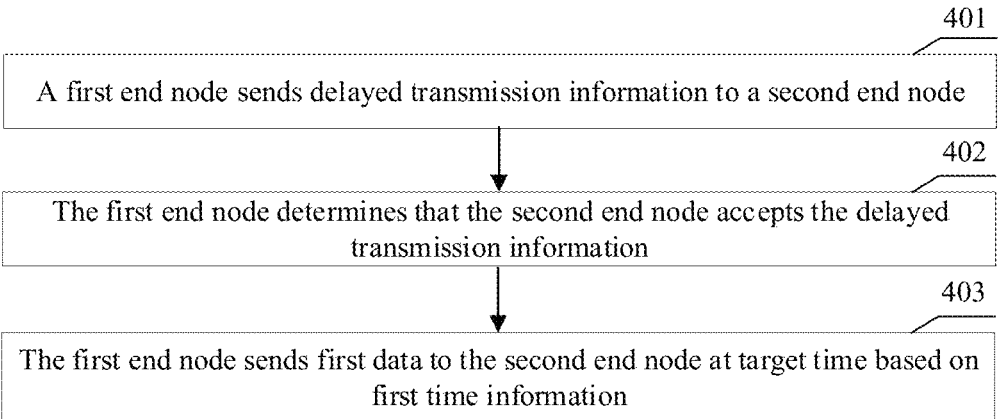
FIG. 4 is a flowchart of a data transmission method according to some embodiments of this application.

FIG. 4 is a flowchart of a data transmission method according to an embodiment of this application. As shown in FIG. 4, the method includes the following operations.

401: A first end node sends delayed transmission information to a second end node.

The delayed transmission information indicates first time information at which the first end node sends first data to the second end node. The first time information may be a time point (corresponding to absolute time), or may be duration (corresponding to relative time), or may be a time period. For example, the first time information is a time point (namely, a moment) that is estimated by the first end node and at which the first data is sent to the second end node. For another example, the first time information is duration. The duration is duration between a moment at which the second end node receives the delayed transmission information (corresponding to a moment at which the first end node sends the delayed transmission information) and a moment at which the first end node sends the first data to the second end node. If the first time information is a time point, duration between this time point and a time point at which the first end node actually sends the first data to the second end node is less than a threshold, for example, 100 ms or 10 ms. If the first time information is a time period, the first end node sends the first data to the second end node in the time period. A start moment of the time period may be understood as an earliest moment that is estimated by the first end node and at which the first data is sent to the second end node. An end moment of the time period may be understood as a latest moment that is estimated by the second end node and at which the first data is sent to the second end node. For example, a current moment is a reference time point. The first end node sends the first data to the second end node after an estimated delay of 100 ms. The first time information indicates 100 ms. The second end node parses the delayed transmission information to determine that the first data can be received approximately 100 ms after the delayed transmission information (corresponding to the reference time point) is received.

In some embodiments, the first end node and the second end node may be any two different end nodes in a same distributed network (for example, a mobile distributed network), or may be any two end nodes in a peer-to-peer network that includes a plurality of end nodes. The mobile distributed network may be a network including a plurality of mobile devices (such as a mobile phone or a notebook computer). In some embodiments, the first end node may be an end node serving as a server in the client/server structure, and the second end node may be an end node serving as a client in the client/server structure.

In some embodiments, the delayed transmission information is a data credential, the data credential indicates the first time information at which the first end node sends the first data to the second end node, and the data credential is further used to verify an identity of the first end node. The second end node may verify the identity of the first end node based on the data credential, to avoid interference from a malicious end node, so that security is improved.

In some embodiments, before sending the delayed transmission information to the second end node, the first end node may further receive a data obtaining request from the second end node, where the data obtaining request is used to obtain the first data. A possible embodiment of operation 401 is as follows: The first end node sends the delayed transmission information to the second end node in response to the data obtaining request.

402: The first end node determines that the second end node accepts the delayed transmission information.

A possible embodiment of operation 402 is as follows: The first end node receives a first message from the second end node, where the first message is sent by the second end node after the delayed transmission information is received, the first message includes first indication information, and the first indication information indicates that the second end node allows the first end node to send the first data. It should be understood that the first message may include content for indicating to allow the first end node to send the first data. The first message may alternatively be a message agreed between the end nodes. In other words, the first message does not need to explicitly include the content of allowing the first end node to send the first data.

Another embodiment of operation 402 is as follows: If the first end node does not receive a third message from the second end node in first duration after sending the delayed transmission information, the first end node determines that the second end node accepts the delayed transmission information, where the third information includes third indication information, and the third indication information indicates that the second end node refuses to allow the first end node to send the first data. The first duration may be 10 ms, 30 ms, 100 ms, 1 s, 3 s, or the like. It should be understood that the first end node may configure the first duration based on an actual situation.

403: The first end node sends the first data to the second end node at target time based on the first time information.

The target time may be a time point that is determined based on the first time information and at which the first data is sent. In some embodiments, the first time information is the target time (namely, a time point at which the first end node sends the first data). In some embodiments, the first time information is duration, and the target time is a time point obtained by the first end node based on the duration. For example, a moment at which the first end node sends the delayed transmission information is a first moment, the second time information is target duration (one duration), the target time is a second moment, the second moment is after the first moment, and duration between the second moment and the first moment is the target duration. In some embodiments, the first time information is a time period, the target time is included in the time period, start time of the time period is an earliest time point that is estimated by the first end node and at which the first data is sent to the second end node, and end time of the time period is estimated latest time at which the first data is sent to the second end node.

In some embodiments, the first end node may determine the reference time (that may be understood as the earliest time point at which the first data may be sent) of the first data based on the first time information, and then starts to monitor whether a condition for sending the first data to the second end node is met, where the reference time may be a time point that is indicated by the delayed transmission information and at which the first end node sends the first data to the second end node. If the first end node meets the condition for sending the first data to the second end node, the first end node sends the first data to the second end node at the reference time (corresponding to the target time). If the first end node does not meet the condition for sending the first data to the second end node, the first end node continues to monitor whether the first end node meets the condition for sending the first data to the second end node. When the first end node meets the condition for sending the first data to the second end node (corresponding to the target time), the first end node sends the first data to the second end node. For example, when the first end node reaches the reference time (a time point), a load amount on the first end node starts to be monitored. At the target time at which the load amount on the first end node is less than a load threshold, the first data starts to be sent to the first end node.

In some embodiments, the first message further includes an acknowledgment sending time (corresponding to the target time) of the first data, and the acknowledgment sending time may be time that is indicated by the second end node and at which the first end node sends the first data. Operation 402 may be replaced with: The first end node sends the first data to the second end node at calibration time based on the first message, where the calibration time is obtained based on the first message. For example, the first message includes the calibration time (namely, the acknowledgment sending time) for indicating the first end node to send the first data, and the first end node sends the first data to the second end node at the calibration time based on the first message. In an embodiment, the first time information is a time point, and the calibration time is a time point after the time point.

Operation 402 and operation 403 may be replaced with operation 404: The first end node determines that the second end node refuses the delayed transmission information, and the first end node cancels transmission of the first data.

A possible embodiment in which the first end node determines that the second end node refuses the delayed transmission information is as follows: The first end node receives a second message from the second end node, where the second message is sent by the second end node after the delayed transmission information is received, the second message includes second indication information, and the second indication information indicates that the second end node refuses to allow the first end node to send the first data.

Another embodiment in which the first end node determines that the second end node refuses the delayed transmission information is as follows: If the first end node does not receive a fourth message from the second end node in second duration after sending the delayed transmission information, the first end node determines that the second end node refuses the delayed transmission information, where the fourth information includes fourth indication information, and the fourth indication information indicates that the second end node allows the first end node to send the first data. The second duration may be 10 ms, 30 ms, 100 ms, 1 s, or the like. It should be understood that the first end node may configure the second duration based on an actual situation.

In some embodiments, before the first end node cancels transmission of the first data, the following operations are performed: The first end node creates a sending task of sending the first data to the second end node. That the first end node cancels transmission of the first data may be: The first end node cancels the sending task. That the first end node cancels the sending task may be that the first end node deletes the sending task. In some embodiments, after receiving the data request, the first end node creates the sending task of sending data requested by the data request. If determining not to send the data requested by the data request, the first end node deletes the sending task. Otherwise, the first end node executes the sending task.

In some embodiments, that the first end node cancels transmission of the first data includes: The first end node skips creating the sending task of sending the first data to the second end node. In some embodiments, the first end node creates the sending task of sending the data only after determining to send the data (corresponding to accepting the delayed transmission information). In this way, operations of creating the sending task can be reduced.

In some embodiments of this application, when the first end node cannot immediately send the first data to the second end node, the first end node sends the delayed transmission information to the second end node, to indicate the estimated first time information at which the first data is sent to the second end node. When determining that the second end node refuses the delayed transmission information, the first end node cancels transmission of the first data. When determining that the second end node accepts the delayed transmission information, the first end node sends the first data to the second end node. For example, the second end node sends, to a plurality of end nodes, the data obtaining request for obtaining the first data, the plurality of end nodes separately send feedback information for the data obtaining request to the second end node, and each piece of feedback information includes time information that is estimated by one of the plurality of end nodes and at which the first data is sent to the second end node. The second end node selects, based on the feedback information from the plurality of end nodes, to allow the first end node in the plurality of end nodes to send the first data to the second end node. The first end node sends the first data to the second end node, and an end node other than the first end node in the plurality of end nodes does not send the first data to the second end node (corresponding to canceling transmission of the first data). In this example, for any end node other than the first end node in the plurality of end nodes, when determining that the second end node refuses to allow the any end node to send the first data to the second end node, the any end node cancels transmission of the first data, so that redundant transmission of data can be avoided, and a load of the any end node can be reduced. The second end node may select one end node (for example, an end node that first sends the first data to the second end node) from the plurality of end nodes to send the first data to the second end node. Therefore, reliability is high, and the first data can be received in a timely manner (in other words, waiting time is shortened). In this example, one end node or some end nodes in the plurality of end nodes send the first data to the second end node, and at least some end nodes do not need to send the first data to the second end node, so that redundant transmission of data can be avoided. It should be understood that when a network load is heavy, the second end node may select an end node with a light load to send required content to the second end node, so that an end node load during data transmission in the distributed network is balanced, data obtaining efficiency is improved, and the network load is reduced.

In some embodiments of this application, when determining that the second end node accepts the delayed transmission information, the first end node sends the first data to the second end node at the target time, so that a load can be reduced. When determining that the second end node refuses the delayed transmission information, the first end node cancels transmission of the first data, so that redundant transmission of data can be reduced, and a load of the first end node can be reduced.

Figure 5:
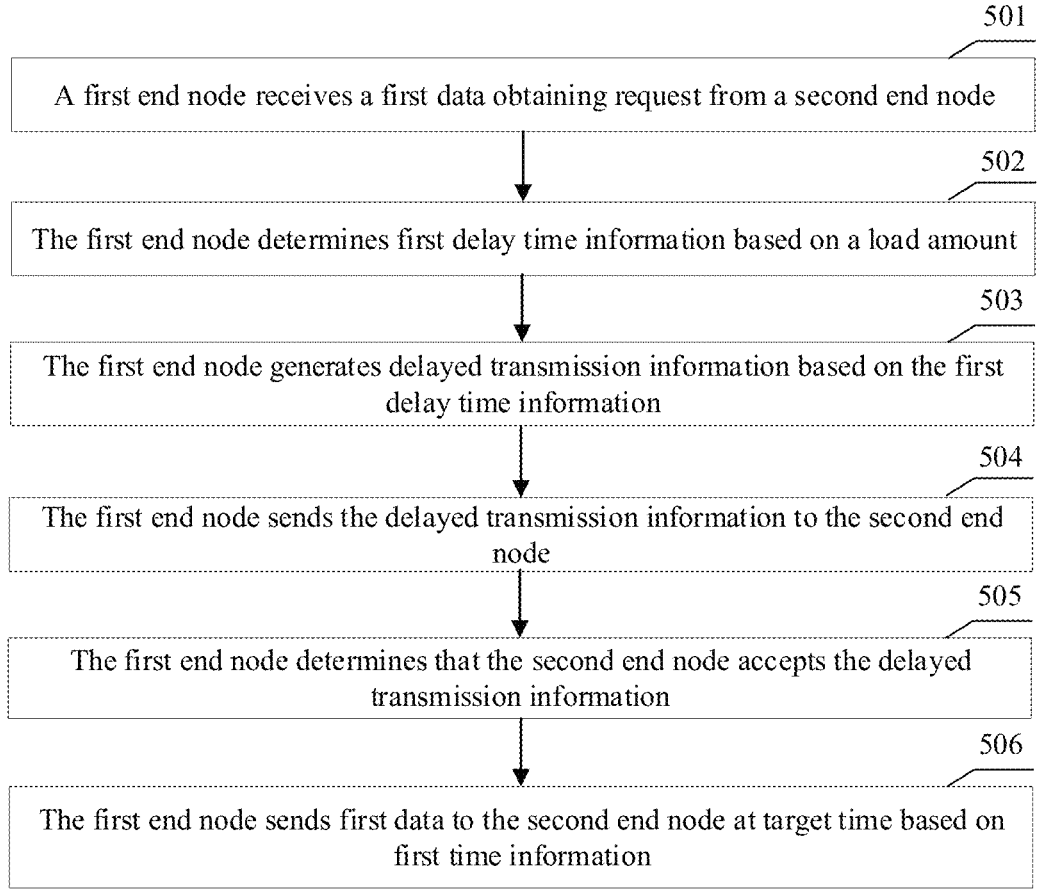
FIG. 5 is a flowchart of another data transmission method according to some embodiments of this application.

FIG. 5 is a flowchart of another data transmission method according to an embodiment of this application. The method procedure in FIG. 5 is a refinement and improvement of the method procedure in FIG. 4. As shown in FIG. 5, the method includes the following operations.

501: A first end node receives a first data obtaining request from a second end node.

The first data obtaining request is used to obtain first data. The first data obtaining request may include a peer identifier PID of the second end node and a content identifier CID of the first data. In some embodiments, the first end node receives the first data obtaining request sent by the second end node in a broadcast or multicast manner.

502: The first end node determines first delay time information based on a load amount.

The first delay time information may be duration (for example, duration between a current moment and a moment at which the first data is sent), or may be a time point (for example, an estimated time point at which the first data is sent). In some embodiments, the first delay time information is first delay duration, the first delay duration is positively correlated with the load amount, and the load amount is an amount of data currently to be sent by the first end node. A possible embodiment of operation 502 is as follows: If the first end node stores the first data and the load amount is greater than a load threshold, the first end node determines the first delay time information based on the load amount. The load threshold may be a threshold that is set based on an actual requirement, for example, 20 MB, 100 MB, or 1 GB. If the load amount of the first end node is greater than the load threshold, it indicates that the first end node cannot immediately send the first data to the second end node (corresponding to a requesting end node), and needs to delay sending the first data (namely, content data requested by the second end node) to the second end node. An optional calculation equation in which the first end node calculates, based on the load amount, delayed sending time (repayment time) at which the first data is sent to the second end node is as follows:

$$rt1 = \frac{\sum_{f \in Q_i} \text{size}(f) + \text{size}(f')}{UB_i} + D_{i,j} \quad (1)$$

Herein, rt1 indicates the delayed sending time (one duration) at which the first end node sends the first data to the second end node, i indicates the first end node, j indicates the second end node, f and f' are file resources of an end node i, size (f) is a data size of the first data, size (f') is a data size of a queue being processed by the first end node (namely, a current to-be-sent data size), $UB_i$ is a sending bandwidth of the end node i, and $D_{i,j}$ is a data transmission delay between the end node i and an end node j. Generally, this parameter has small impact, and may be an optional parameter. In some embodiments, the first delay time information is the delayed sending time. In some embodiments, the first end node calculates, based on the load amount, the delayed sending time at which the first data is sent to the second end node, that is, determines the first delay time information. In some embodiments, the first end node may obtain the first delay time information (a time point) based on the delayed sending time and the current moment. The current moment may be a moment at which the delayed sending time is obtained. For example, the first end node determines that a time point (corresponding to an estimated time point at which the first data is sent) of the delayed sending time (rt1) after the current moment is the first delay time information.

503: The first end node generates delayed transmission information based on the first delay time information.

The first time information is obtained based on the first delay time information. In some embodiments, the first delay time information is a time point (for example, an estimated time point at which the first data is sent), and the first time information is the time point. In some embodiments, the first delay time information is duration (for example, the duration between the current moment and the moment at which the first data is sent), and the first time information is the duration.

In some embodiments, the delayed transmission information is a data credential, the data credential indicates the first time information at which the first end node sends the first data to the second end node, and the data credential is further used to verify an identity of the first end node.

Operation 502 and operation 503 may be replaced with the following operations: If the first end node does not store the first data and obtains the first data, the first end node determines second delay time information based on the second time information, where the second time information is estimated time information at which the first end node obtains the first data; and the first end node generates the delayed transmission information based on the second delay time information, where the first time information is obtained based on the second delay time information. The second time information may be a time point that is estimated (or obtained) by the first end node and at which the first end node obtains the first data, or may be duration between an estimated (or obtained) current moment and a moment at which the first end node receives the first data. The second delay time information may be a time point that is estimated (or calculated) by the first end node based on the second time information and at which the first data is sent, or may be delay duration that is estimated (or calculated) by the first end node based on the second time information and for which the first data is sent, namely, duration between a moment at which the first end node sends the first data and a current moment. A case in which the first end node obtains the first data may be: The first end node stores a data credential for an end node to send the first data to the first end node, where the data credential may indicate time (corresponding to the second time information) at which the end node sends the first data to the second end node. It should be understood that, if the first end node has a data credential for another end node to send the first data to the first end node, the first end node may estimate, based on the data credential and a load amount, delayed sending time (namely, delayed sending duration) at which the first data is sent to the second end node. In some embodiments, a calculation equation in which the first end node calculates (corresponding to estimation), based on the second time information, the delayed sending time (one duration) at which the first data is sent to the second end node is as follows:

$$rt2 = \frac{\sum_{f \in Q_i} \text{size}(f) + \text{size}(f')}{UB_i} + D_{i,j} + rt[i-1] \quad (2)$$

Herein, rt2 is the delayed sending time at which the first data is sent to the second end node, rt[i−1] is the duration that is estimated by the first end node and that is between the current moment and the moment at which the first end node obtains the first data, i indicates the first end node, j indicates the second end node, f and f' are file resources of an end node i, size(f) is a data size of the first data, size(f') is a data size of a queue being processed by the first end node, $UB_i$ is a sending bandwidth of the end node i, and $D_{i,j}$ is a data transmission delay between the end node i and an end node j. Generally, this parameter has small impact, and may be an optional parameter. It should be understood that rt[i−1] may be understood as duration between a moment at which the first end node calculates rt2 and a moment at which the first end node receives the first data. In some embodiments, the second delay time information is the delayed sending time (namely, rt2) that is obtained through calculation based on the second time information. In some embodiments, the first end node calculates, based on the second time information, the delayed sending time at which the first data is sent to the second end node, that is, determines the second delay time information. In some embodiments, the first end node may obtain the second delay time information (a time point) based on the delayed sending time and the current moment. The current moment may be a moment at which the delayed sending time is obtained. For example, the first end node determines that a time point (corresponding to an estimated time point at which the first data is sent) of the delayed sending time (rt2) after the current moment is the second delay time information.

504: The first end node sends the delayed transmission information to the second end node.

An embodiment of operation 504 may be the same as an embodiment of operation 401.

505: The first end node determines that the second end node accepts the delayed transmission information.

An embodiment of operation 505 may be the same as an embodiment of operation 402.

506: The first end node sends the first data to the second end node at target time based on the first time information.

The target time is determined based on the first time information. An embodiment of operation 505 may be the same as an embodiment of operation 403.

Operation 505 and operation 506 may be replaced with operation 507: The first end node determines that the second end node refuses the delayed transmission information, and the first end node cancels transmission of the first data. An embodiment of operation 507 may be the same as an embodiment of operation 404.

In some embodiments, the first end node may further perform the following operations: The first end node receives a second data obtaining request (corresponding to a data request), where the second data obtaining request is used to obtain second data; and if the first end node does not store the second data and does not obtain the second data, the first end node refuses the second data obtaining request. For example, when the first end node receives a second data obtaining request of the second end node (or another end node), that the first end node refuses the second data obtaining request may be that the first end node cancels transmission of the second data. The case of not storing the second data and not obtaining the second data includes: not storing the second data and not storing a first data credential. The first data credential is other than a credential for any end node to send the second data to the first end node. That the first end node does not store the second data and does not obtain the second data may be understood as that the first end node cannot obtain the second data in a short time. If the first end node does not store the second data and does not obtain the second data, the first end node refuses the second data obtaining request, so that the end node that sends the data obtaining request obtains the second data from an end node other than the first end node, a speed of obtaining the second data can be increased, and a load of the first end node is reduced.

In some embodiments, the first end node may further perform the following operations: The first end node receives a third data obtaining request from an end node, where the third data obtaining request is used to obtain third data; and if the first end node stores the third data and a current load amount is not greater than the load threshold, the first end node immediately sends the third data to the end node. In other words, when the load amount is less than the load threshold, the first end node may immediately send corresponding data to another end node.

In some embodiments of this application, if the load amount is large, the first end node sends, to the second end node, the delayed transmission information for indicating to delay sending the first data to the second end node, so that redundant transmission of data can be reduced, and a load of the first end node is reduced.

Figure 6:
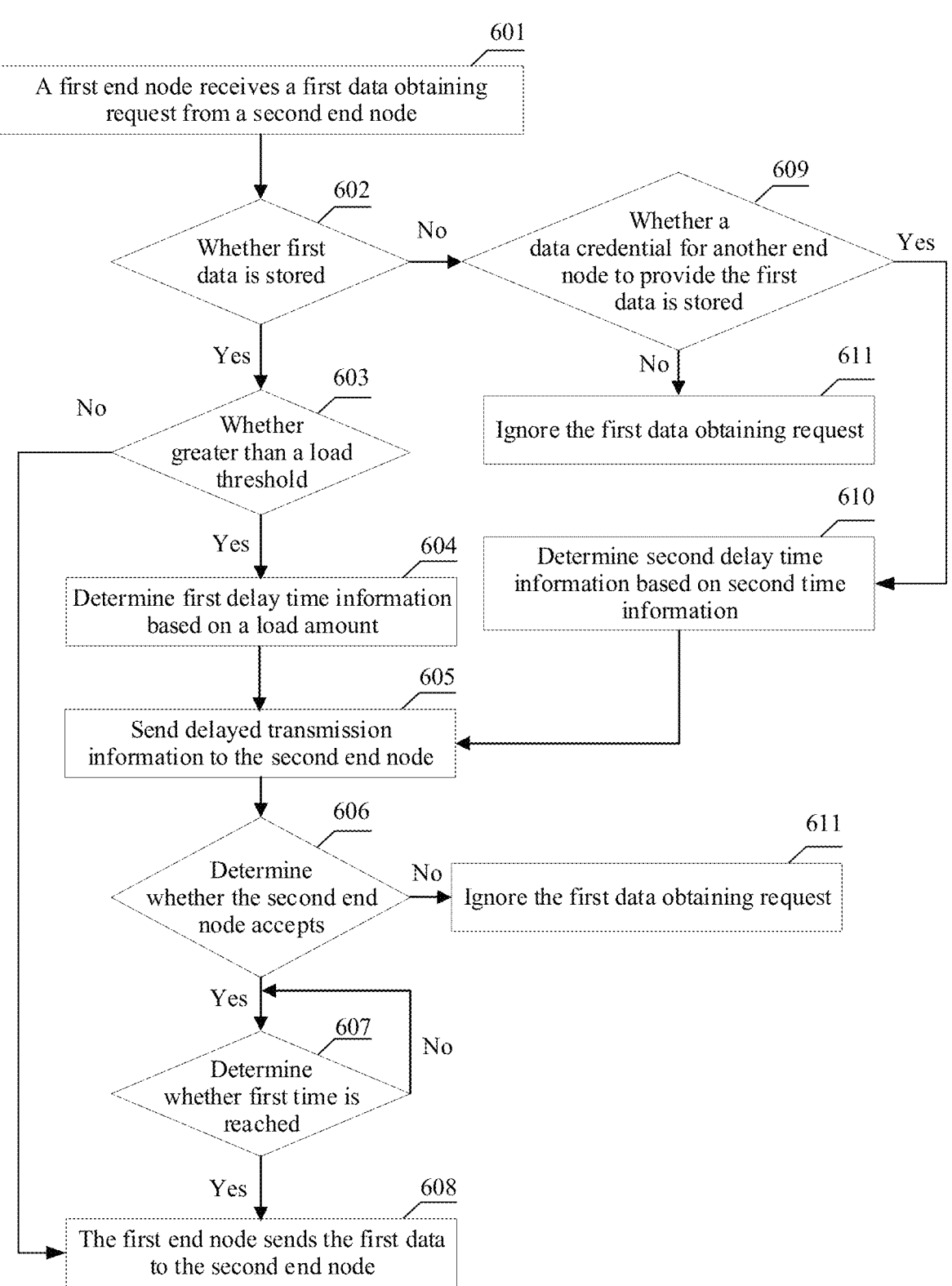
FIG. 6 is a flowchart of another data transmission method according to some embodiments of this application.

FIG. 6 is a flowchart of another data transmission method according to an embodiment of this application. The method procedure in FIG. 6 is a refinement and improvement of the method procedures in FIG. 4 and FIG. 5. As shown in FIG. 6, the method includes the following operations.

601: A first end node receives a first data obtaining request from a second end node.

The first data obtaining request is used to obtain first data. An embodiment of operation 601 may be the same as an embodiment of operation 501.

602: The first end node queries whether the first data is stored.

If the first data is stored, operation 603 is performed; or if the first data is not stored, operation 609 is performed.

603: The first end node determines whether a load amount is greater than a load threshold.

If yes, operation 604 is performed; or if not, operation 608 is performed.

604: The first end node determines first delay time information based on the load amount.

An embodiment of operation 604 may be the same as an embodiment of operation 502. Details are not described herein again.

605: The first end node sends delayed transmission information to the second end node.

The delayed transmission information indicates first time information at which the first end node sends the first data to the second end node. The delayed transmission information may be a data credential, and the data credential is further used to verify an identity of the first end node. FIG. 7 is a schematic diagram of an example of a packet format used for communication between a first end node and a second end node according to an embodiment of this application. As shown in FIG. 7, a packet format (for example, delayed transmission information) used for communication between the first end node and the second end node includes: a peer identifier (peer ID), a content identifier (content ID), a message type, a length field, an estimated sending time (repayment time), and a content data field. For example, the peer identifier occupies 128 bits, the content identifier occupies 128 bits, the message type occupies 16 bits, the length field occupies 16 bits, the estimated sending time (corresponding to the first time information) is 32 bits, and the content data field. During data encapsulation, a field that needs to be included is determined based on a message type. For example, the first data obtaining request does not include the estimated sending time rt field and the content data field. A data credential (for example, the delayed transmission information) does not need to include the content data field.

In some embodiments, considering that in a distributed network, a terminal device that does not support this feature and a terminal device that supports this feature are in hybrid networking, a requesting end node (for example, the second end node) may carry, in a data request (for example, the first data obtaining request), capability information about whether "delayed sending" of content data (for example, the first data) requested by the requesting end node is supported, and whether rt information (for example, the delayed transmission information) of a content provider (for example, the first end node) is received, to maintain information about the terminal device that supports the feature and the terminal device that does not support the feature in the network, so that when sending data, a requested end node (for example, the first end node) may preferentially send the data to the terminal device that supports the feature, to avoid redundant transmission caused by multiple transmissions of content.

606: The first end node determines whether the second end node accepts the delayed transmission information.

If yes, operation 607 is performed; or if not, operation 611 is performed.

607: The first end node determines whether first time is reached.

The first time is time (corresponding to the first time information) at which the first end node sends the first data to the second end node. If yes, operation 608 is performed; or if not, operation 607 continues to be performed. It should be understood that, if the first time is not reached, waiting needs to be continued until the first time is reached. In other words, operation 607 continues to be performed. In some embodiments, the first time is a time point, and determining whether the first time is reached may be determining whether the time point is reached. In some embodiments, the first time is a time period, and determining whether the first time is reached may be determining whether a start moment of the first time is reached.

608: The first end node sends the first data to the second end node.

It should be understood that it is an ideal case in which the first end node sends the first data to the second end node at the first time. This requires that the first end node has sufficient resources to send the first data to the second end node when the first time is reached. During actual application, the first end node may send the first data to the second end node after the first time.

609: The first end node queries whether a data credential for another end node to provide the first data to the first end node is stored.

If yes, operation 610 is performed; or if not, operation 611 is performed.

610: The first end node determines second delay time information based on second time information.

The second time information is estimated time information at which the first end node obtains the first data.

611: The first end node ignores the first data obtaining request.

If the first end node does not have a data credential of another end node, the first data obtaining request of the second end node may be ignored. In some embodiments, the first end node may send, to the second end node, a response message indicating that the first end node does not have the first data.

From a perspective of the entire distributed network (including a plurality of requesting end nodes and a plurality of requested end nodes), the requesting end node (for example, the second end node) may select an end node with a light load to send required content to the requesting end node, so that an end node load during data transmission in the distributed network is balanced, data obtaining efficiency is improved, and a network load is reduced. When the load is heavy, the requested end node (for example, the first end node) may delay sending data to the requesting end node. In addition, the data is sent only when it is determined that the requesting end node accepts the delayed sending, so that redundant transmission of data can be reduced.

In some embodiments of this application, when a current load is heavy, the first end node sends, to the second end node, the delayed transmission information for indicating to delay sending the first data to the second end node, and immediately sends the first data to the second end node when a load is light, so that redundant transmission of data can be reduced, and transmission efficiency can be improved.

The foregoing embodiments describe operations performed by the requested end node (namely, the first end node) in the data transmission solution. The following describes operations performed by the requesting end node (namely, the second end node) in the data transmission solution.

FIG. 8 is a flowchart of another data transmission method according to an embodiment of this application. As shown in FIG. 8, the method includes the following operations.

801: A second end node receives delayed transmission information from a first end node.

Operation 801 corresponds to operation 401. The delayed transmission information indicates first time information at which the first end node sends first data to the second end node. In some embodiments, the delayed transmission information is a data credential, the data credential indicates the first time information at which the first end node sends the first data to the second end node, and the data credential is further used to verify an identity of the first end node. In some embodiments, the first end node and the second end node may be any two different end nodes in a same distributed network (for example, a mobile distributed network), or may be any two end nodes in a peer-to-peer network that includes a plurality of end nodes. In some embodiments, the first end node may be an end node serving as a server in a client/server structure, and the second end node may be an end node serving as a client in the client/server structure.

802: The second end node sends a first message.

The first message is sent after the delayed transmission information is received. The first message includes first indication information. The first indication information indicates that the second end node allows the first end node to send the first data.

In some embodiments, before performing operation 802, the second end node may perform the following operation: If a difference between a credit value of the first end node and a credit value of a third end node is greater than a credit threshold, the second end node determines to send the first message. For the second end node, the difference between the credit value of the first end node and the credit value of the third end node is a credit value obtained by subtracting the credit value of the third end node from the credit value of the first end node. The credit threshold may be a threshold that is set based on an actual requirement, for example, 0.2, 0.25, or 0.3. A value range of the credit value is between 0 and 1. In some embodiments, the delayed transmission information may be the data credential for the first end node to send the first data to the second end node. When the second end node stores a data credential for the third end node to send the first data to the second end node, the second end node may compare the credit value of the first end node with the credit value of the third end node, and select a data credential with higher credit. In other words, if the second end node does not locally store the first data, but the second end node locally stores a data credential of another end node that sends the first data to the second end node, two data credentials are compared, and a data credential of an end node with higher credit is selected. For example, the delayed transmission information is the data credential for the first end node to send the first data to the second end node. If the second end node stores the data credential for the third end node to send the first data to the second end node, and the difference between the credit value of the first end node and the credit value of the third end node is greater than the credit threshold, the second end node determines to accept the data credential of the first end node (namely, the delayed transmission information). For another example, the delayed transmission information is the data credential for the first end node to send the first data to the second end node. The second end node stores a plurality of data credentials for a plurality of end nodes to send the first data to the second end node. The second end node compares the credit value of the first end node with a credit value of a reference end node with a highest credit value in the plurality of end nodes, and if a difference between the credit value of the first end node and the credit value of the reference end node is greater than the credit threshold, determines to accept the data credential of the first end node. In some embodiments, the first end node selects an end node with a higher credit value to send the first data to the second end node, so that reliability of obtaining the first data can be improved.

In some embodiments, before performing operation 802, the second end node may perform the following operation: If an absolute value of a difference between the credit value of the first end node and a credit value of a fourth end node is less than the credit threshold, and first time is earlier than second time, the second end node determines to send the first message. The fourth end node is an end node allowed by the second end node to send the first data to the second end node. The first time is time at which the first end node sends the first data to the second end node. The second time is time at which the fourth end node sends the first data to the second end node. In some embodiments, if the second end node stores a credential for the fourth end node to send the first data to the second end node, the second end node obtains the credit value of the fourth end node. It should be understood that, if the second end node does not store a data credential for another end node to send the first data to the second end node, the delayed transmission information is directly accepted. Therefore, whether the data credential for the other end node to send the first data to the second end node is stored needs to be queried, to receive the first data more quickly. In some embodiments, the delayed transmission information may be the data credential for the first end node to send the first data to the second end node. When the second end node stores the data credential for the fourth end node to send the first data to the second end node, the second end node first compares the credit value of the first end node with the credit value of the fourth end node. When the absolute value of the difference between the credit value of the first end node and the credit value of the fourth end node is not greater than the credit threshold, an earlier data credential for sending the first data to the second end node is selected. For example, the data credential from the first end node is saved, and the data credential from the fourth end node is deleted. In some embodiments, both the data credential of the first end node (namely, the delayed transmission information) and the data credential of the fourth end node carry delayed sending time (corresponding to the first time information). The second end node may select to accept a data credential with earlier delayed sending time. For example, the data credential of the first end node (namely, the delayed transmission information) indicates first time (corresponding to the first time information) at which the first end node sends the first data to the second end node. The data credential that is of the fourth end node and that is stored in the second end node indicates second time at which the fourth end node sends the first data to the second end node. If the absolute value of the difference between the credit value of the first end node and the credit value of the fourth end node is not greater than the credit threshold, and the first time is earlier than the second time, the second end node determines to accept the data credential of the first end node. In some embodiments, when the absolute value of the difference between the credit value of the first end node and the credit value of the fourth end node is less than the credit threshold, the second end node determines to accept the first end node with earlier sending time, so that the required first data can be obtained more quickly.

In some embodiments, before performing operation 802, the second end node may perform the following operation: If the second end node does not store a credential for any end node to send the first data to the second end node, the second end node determines to send the first message. In some embodiments, the second end node may notify, in a timely manner, the first end node to send the first data to the second end node.

Operation 802 may be replaced with operation 803: The second end node sends a second message. The second message is sent after the delayed transmission information is received. The second message includes second indication information. The second indication information indicates that the second end node refuses to allow the first end node to send the first data.

In some embodiments, before performing operation 803, the second end node may perform the following operation: If an absolute value of a difference between the credit value of the first end node and a credit value of a fifth end node is not greater than the credit threshold, and the credit value of the first end node is less than the credit value of the fifth end node, the second end node determines to send the second message. The fifth end node is an end node allowed by the second end node to send the first data to the second end node. The credit threshold may be a real number greater than 0. In some embodiments, the first end node selects an end node with a higher credit value to send the first data to the second end node, so that reliability of obtaining the first data can be improved.

In some embodiments, before performing operation 803, the second end node may perform the following operation: The second end node determines, based on a difference between the credit value of the first end node and a credit value of a sixth end node, the first time, and third time, to send the second message. The sixth end node is an end node allowed by the second end node to send the first data to the second end node. The first time is the time at which the first end node sends the first data to the second end node. The third time is time at which the sixth end node sends the first data to the second end node. That the second end node determines, based on a difference between the credit value of the first end node and a credit value of a sixth end node, the first time, and third time, to send the second message may be: If the absolute value of the difference between the credit value of the first end node and the credit value of the sixth end node is not greater than the credit threshold, and the first time is not earlier than the third time, the second end node determines to send the second message.

In some embodiments, an end node for sending the first data is selected to be accepted by comprehensively considering the credit value of the end node and the time for sending the first data, so that both a speed and reliability of obtaining the first data can be considered.

In some embodiments, before performing operation 803, the second end node may perform the following operation: If the second end node stores the first data, the second end node determines to send the second message. In some embodiments, the second end node does not need the first end node to send the first data to the second end node, to avoid that the first end node sends the first data to the second end node.

In some embodiments of this application, the second end node sends the first message based on the delayed transmission information, so that required data can be quickly obtained. The second end node sends the second message based on the delayed transmission information, so that redundant transmission of data can be reduced.

In the method procedure in FIG. 8, the second end node is used as an example to describe a method procedure performed by the requesting end node. It should be understood that, in a distributed network including a plurality of requesting end nodes (for example, second end nodes) and a plurality of requested end nodes (for example, first end nodes), one requesting end node (for example, the second end node) may accept one or at least two requested end nodes that can provide data for the requesting end node quickly (for example, most quickly) in the plurality of requesting end nodes to provide data for the requesting end node, and refuse to allow other requested end nodes to provide data for the requesting end node. In this way, the requesting end node can obtain required data more quickly, and the requested end node can avoid redundant transmission of data. For example, the second end node sends a first data obtaining request to a plurality of requested end nodes (corresponding to the first end node), where the first data obtaining request is used to obtain the first data. M requested end nodes (including the first end node) receive the first data obtaining request, and send a data credential to the second end node, where a data credential sent by each requested end node indicates time at which each requested end node sends the first data to the second end node, and M is an integer greater than 1. The second end node may select (corresponding to accepting) a requested end node (for example, a quickest end node that provides the first data to the requesting end node or an end node with a highest credit value) from the M requested end nodes based on a plurality of data credentials to provide the first data to the requesting end node. The requested end node selected by the second end node provides the first data to the second end node, and other requested end nodes do not send the first data to the second end node. From a perspective of the entire distributed network, one end node or some end nodes in the plurality of requested end nodes provide data requested by the requesting end node for the requesting end node, and other requested end nodes do not provide data for the requesting end node. It should be understood that the requesting end node may select a requested end node with a low end node load to provide data for the requesting end node, so that an end node load of each requested end node can be balanced, and a network load can be reduced.

In some embodiments of this application, the second end node determines to allow or refuse to allow the first end node to send the first data to the second end node, so that required data can be obtained more quickly, and a network load can be reduced.

Figure 9A:
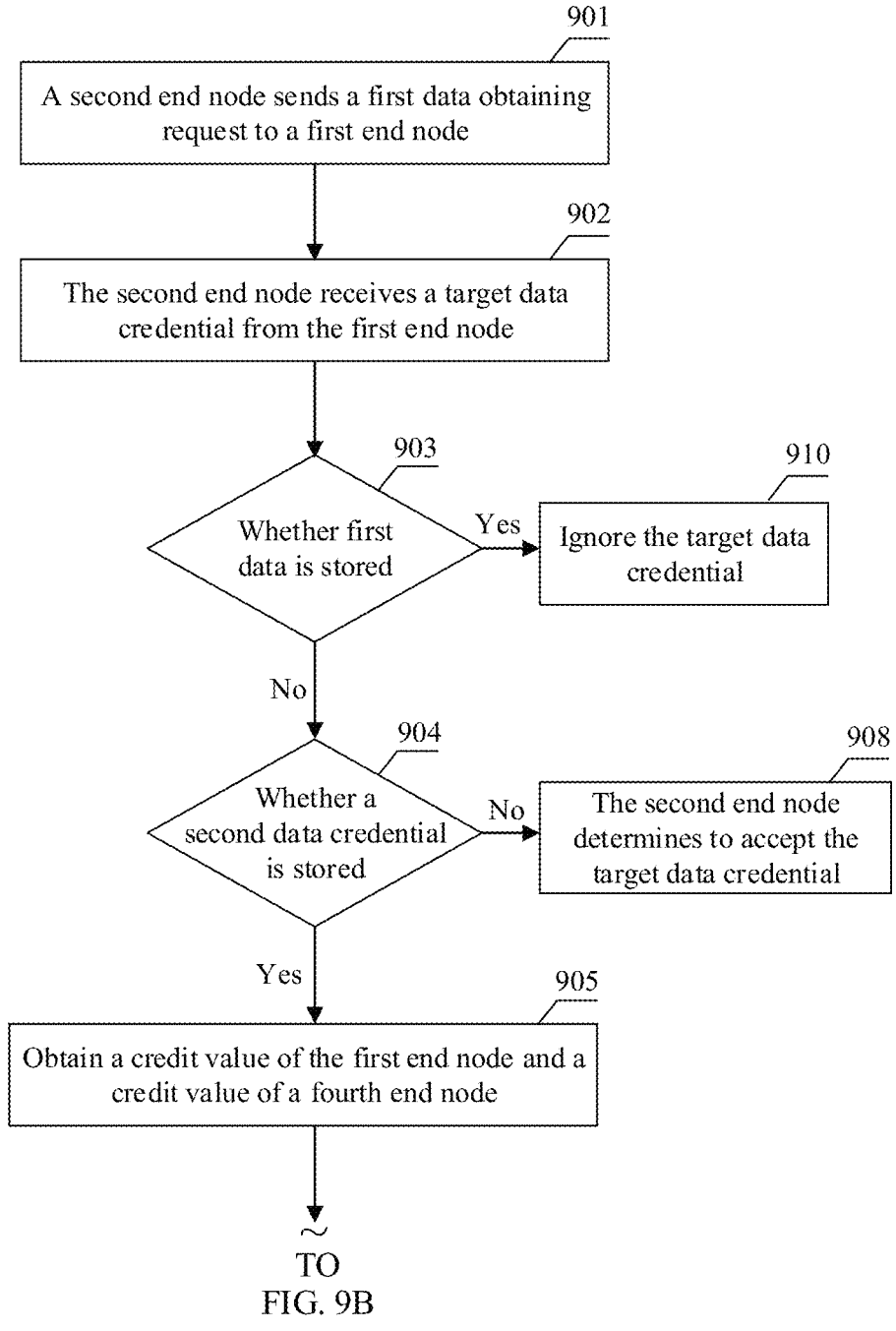
FIG. 9A and FIG. 9B are a flowchart of another data transmission method according to some embodiments of this application.
Figure 9B:
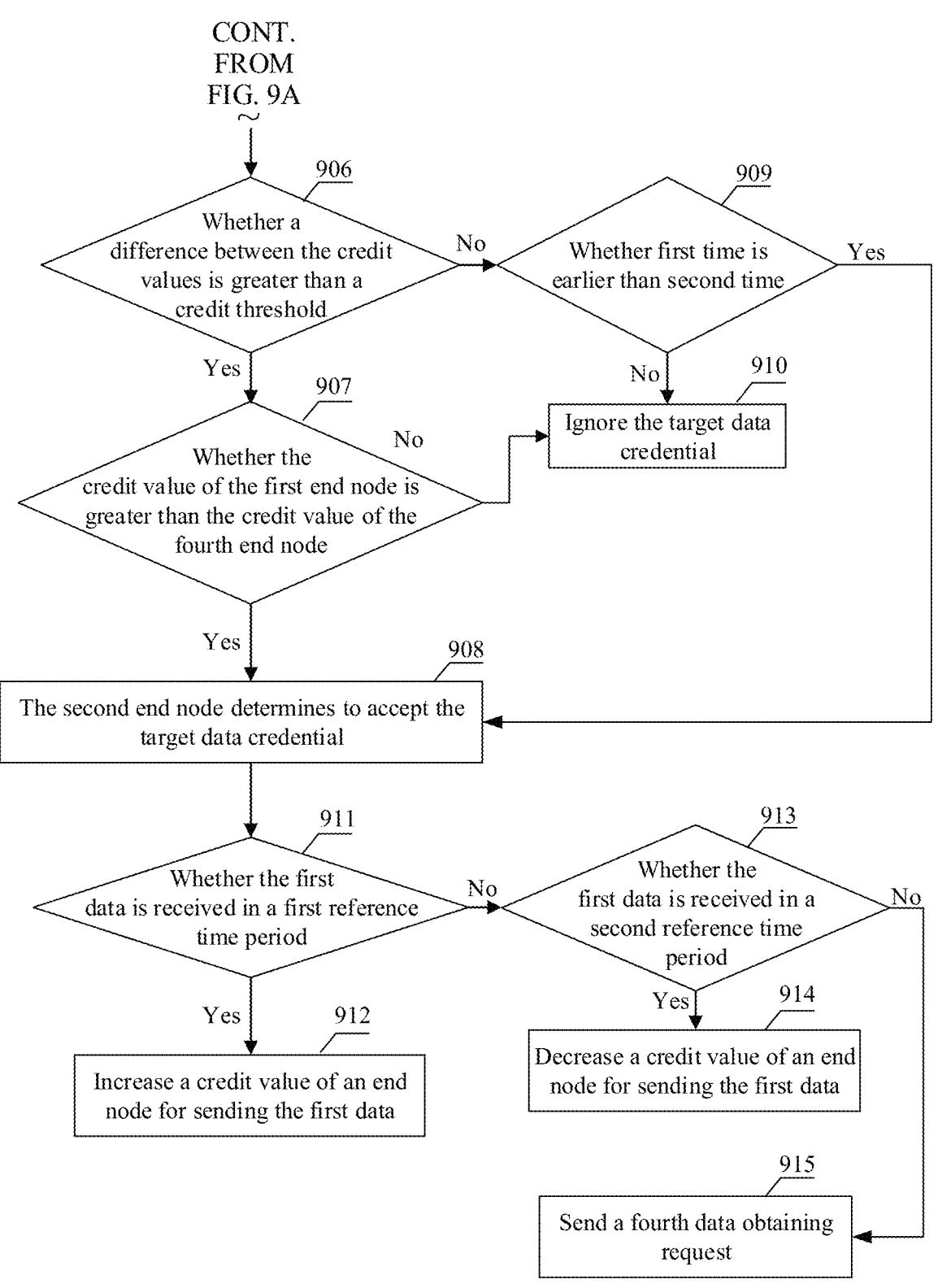

FIG. 9A and FIG. 9B are a flowchart of another data transmission method according to an embodiment of this application. The method procedure in FIG. 9A and FIG. 9B is a refinement and improvement of the method procedure in FIG. 8. As shown in FIG. 9A and FIG. 9B, the method includes the following operations.

901: A second end node sends a first data obtaining request to a first end node.

The first data obtaining request is used to obtain first data.

902: The second end node receives a target data credential from the first end node.

The target data credential may be delayed transmission information. The target data credential indicates first time information at which the first end node sends the first data to the second end node. The data credential is further used to verify an identity of the first end node.

903: The second end node determines whether the first data is already stored.

If yes, operation 910 is performed; or if not, operation 904 is performed.

904: The second end node queries whether a second data credential is stored.

If yes, operation 905 is performed; or if not, operation 908 is performed. The second data credential is a credential of a fourth end node to send second data to the first end node. To improve resource usage and avoid redundant sending, a requesting end node (for example, the second end node) saves only one data credential in a high-credit scenario (for example, a home network), that is, requests data from only one end node. To improve reliability, the requesting end node (for example, the second end node) saves a plurality of data credentials for indicating to delay sending same data in a low-credit scenario (for example, a home network), that is, accepts a request of a plurality of end nodes to provide the same data to the requesting end node.

905: The second end node obtains a credit value of the first end node and a credit value of a fourth end node.

906: The second end node determines whether an absolute value of a difference between the credit value of the first end node and the credit value of the fourth end node is greater than a credit threshold.

If yes, operation 907 is performed; or if not, operation 909 is performed.

907: The second end node determines whether the credit value of the first end node is greater than the credit value of the fourth end node.

If yes, operation 908 is performed; or if not, operation 910 is performed.

908: The second end node determines to accept the target data credential.

In some embodiments, after determining to accept the target data credential, the second end node may restart a content timer based on the first time information indicated by the target data credential, and wait for the first end node to send the data. For example, the second data credential indicates delay duration 3 s for which the fourth end node sends the first data to the second end node. The second end node starts the content timer after determining to accept the second data credential. The first time information is delay duration 2 s for which the first end node sends the first data to the second end node. The second end node restarts the content timer (starting timing from 0 or starting timing from 2 s) after determining to accept the target data credential, to determine whether the first end node sends the first data in a timely manner, and update the credit value of the first end node or re-request the first data. When the second end node stores the second data credential (that is, has already accepted the second data credential), that the second end node accepts the target data credential may be understood as: The second end node updates the data credential corresponding to the first data. In some embodiments, after the second end node accepts the target data credential, a data credential for another end node to send the first data to the second end node is deleted. The second end node may update the data credential, to obtain required data more quickly.

In some embodiments, when the requesting end node (namely, the second end node) determines to accept or refuse the target data credential, an ACK/NACK message mechanism may be selected to indicate acceptance or refusal of the target data credential. In some embodiments, the second end node may alternatively indicate acceptance or refusal of the target data credential through ACK and timeout. For example, after the first end node sends the target data credential, if an ACK message (corresponding to the first message) from the second end node is received within 30 ms, it indicates that the second end node accepts the target data credential, and the first end node may send the first data when target time is reached. Otherwise, if the ACK message is not received, it indicates that the second end node refuses the target data credential, and the first end node does not need to send the first data to the second end node. In some embodiments, the second end node may alternatively indicate acceptance or refusal of the target data credential through NACK and timeout. For example, after the first end node sends the data target credential, if a NACK message from the second end node is not received within 30 ms, it indicates that the second end node accepts the target data credential, and the first end node may send the first data when target time is reached. Otherwise, if the NACK message is received, it indicates that the second end node refuses the target data credential, and the first end node does not need to send the first data. In some embodiments, the second end node may alternatively use NACK and ACK. For example, after the first end node sends the target data credential, if a NACK message (corresponding to the second message) from the second end node is received within 30 ms, it indicates that the second end node refuses the target data credential; or if an ACK message (corresponding to the first message) from the second end node is received within 30 ms, it indicates that the second end node accepts the target data credential, and the first end node sends the first data when first time is reached. If the first end node does not receive the ACK message and the NACK message, it is considered that a packet loss occurs, and the first data may not be sent according to a default configuration.

909: The second end node determines whether the first time is earlier than second time.

The first time is time at which the first end node sends the first data to the second end node. The target data credential indicates the first time (corresponding to the first time information). The second time is time at which the fourth end node sends the first data to the second end node. The second data credential indicates the second time. If yes, operation 908 is performed; or if not, operation 910 is performed.

910: The second end node ignores the target data credential.

In some embodiments of this application, the second end node may first obtain a difference between a credit value C of the first end node and a credit value C' of the fourth end node through comparison. If the difference between C and C' is less than a credit threshold r, but estimated sending time rt (namely, the first time) corresponding to a target data credential V is greater than estimated sending time rt' (namely, the second time) corresponding to a second data credential V', the target data credential V is ignored, the second data credential V' is saved, and an existing timer for rt' corresponding to V' is unchanged, to wait for data transmission. For example, rt' herein may be remaining waiting time for the fourth end node corresponding to V' to send the first data.

911: The second end node determines whether the first data is received in a first reference time period.

The first reference time period (corresponding to a target time period) may be a time period including the first time (a time point) indicated by the target data credential, or may be a time period indicated by the target data credential. For example, the first time information carried in the target data credential is the first time (a time point). The second end node accepts the target data credential. The first reference time period is a time period including the first time. For another example, the first time information carried in the target data credential indicates the first time (a time period). The second end node accepts the target data credential. The first reference time period is the first time. In some embodiments, after receiving a data credential, the second end node may start a content timer to determine whether corresponding data is received at agreed time (corresponding to a first reference time point). If yes, operation 912 is performed; or if not, operation 913 is performed.

912: The second end node increases the credit value of the end node that sends the first data.

For example, the second end node accepts the target data credential of the first end node, that is, accepts the first data sent by the first end node to the second end node at the first time. If the second end node receives the first data from the first end node in the first reference time period, the credit value of the first end node is increased.

913: The second end node determines whether the first data is received in a second reference time period.

The second reference time period is after the first reference time period and does not overlap the first reference time period. The first reference time period and the second reference time period are continuous time periods. A start time point of the second reference time period is not earlier than an end time point of the first reference time period. For example, the first reference time period is from a third time point (a start time point) to a fourth time point (an end time point). The second reference time period is from a fifth time point (a start time point) to a sixth time point (an end time point). The fifth time point is not earlier than the fourth time point. If yes, operation 914 is performed; or if not, operation 915 is performed.

In some embodiments, the second end node accepts the target data credential of the first end node. After the second end node sends the first data (a data block), the first end node and the second end node have established a communication connection. The first end node (namely, a data sender) serves as a parent end node, and the second end node (namely, a data receiver) serves as a child end node. The first end node may consider by default that transmission of a next data block is based on the established connection. After receiving a data block (for example, the first data), the second end node continues to request data from an end node that has established a connection. If the data provider exits the network, after waiting for preset duration (for example, 200 ms), the second end node discards the offline end node, searches for another data provider (namely, an end node that provides data), and continues to request data from the data provider until all data is received.

914: The second end node decreases the credit value of the end node that sends the first data.

For example, the second end node accepts the target data credential of the first end node, that is, accepts the first data sent by the first end node to the second end node at the first time. If the second end node does not receive the first data from the first end node in the first reference time period and receives the first data from the first end node in the second reference time period, the credit value of the first end node is decreased.

915: The second end node sends a fourth data obtaining request.

The fourth data obtaining request is used to obtain the first data. When the second end node does not receive the first data in the second reference time segment, the second end node re-requests the first data.

In some embodiments of this application, the second end node selects, with reference to the credit values of the end nodes and/or the estimated time for sending data, one of the end nodes to provide data to the second end node, so that data obtaining efficiency and reliability can be improved. In addition, the second end node updates the credit value of the requested end node according to whether the requested end node provides data to the second end node in a timely manner, so that a data credential of an end node with a higher credit value is subsequently selected to be accepted.

The foregoing separately describes the data transmission methods implemented by the requested end node (for example, the first end node) and the requesting end node (for example, the second end node). During actual application, a communication apparatus may perform only an operation performed by a requested end node (for example, a first end node), that is, serve as only a requested end node; or may perform only an operation performed by a requesting end node (for example, a second end node), that is, serve as only a requesting end node; or may perform both an operation performed by a requested end node (for example, a first end node) and an operation performed by a requesting end node (for example, a second end node), that is, serve as both a requested end node and a requesting end node. For example, the first end node may serve as a requested end node to provide first data to the second end node, or may serve as a requesting end node to request data from another end node. For another example, the second end node may serve as a requesting end node to request first data from the first end node, or may serve as a requested end node to provide data to another end node.

A requesting end node (for example, the second end node) may determine, based on a credit value of a requested end node, whether to allow the requested end node to provide data for the requesting end node (that is, whether to accept a data credential of the requested end node). Therefore, the requesting end node may need to accurately evaluate a credit value of each requested end node. The following describes a method for a requesting end node to manage a credit value of a requested end node.

Credit evaluation is used to evaluate a credit value of a requested end node in a distributed network, to avoid that a malicious end node damages proper data interaction in the distributed network, so that a network end node in a better network condition can be selected for data interaction. Each end node in the distributed network needs to evaluate a credit value of an end node interacting with the end node. The credit value of each end node is an important reference for a requesting end node to determine whether to accept a data credential of the end node. The following describes, by using an example in which the second end node manages the credit value of the first end node, how each end node evaluates a credit value of an end node interacting with the end node.

In some embodiments, a method for calculating a credit value of an end node in the distributed network is as follows:

$$credit=1/(1+\exp(\theta-2\theta r)) \qquad (3)$$

Herein, credit indicates the credit value of the first end node (corresponding to a requested end node), and $\theta$ is a value that is set based on an actual requirement, for example, 8 by default, so that a value range of credit is between 0 and 1; and r is a proportion of a quantity of times that the first end node fulfills a protocol, namely, a proportion of a quantity of times that the first end node sends data to the second end node at pre-agreed time (also referred to as on time) in a quantity of times that the second end node accepts the data credential of the first end node.

The proportion that the first end node fulfills a protocol satisfies the following equation:

$$r=(n_{success}+1)/(n_{total}+1) \qquad (4)$$

Herein, $n_{total}$ is the quantity of times that the second end node accepts the data credential of the first end node, and $n_{success}$ is a quantity of times that the first end node sends data at pre-agreed time (corresponding to the first reference time period) and that is recorded by the second end node.

Further, each end node locally creates a ledger, to record and maintain a credit value of an end node that interacts with the end node. An example of a structure of a local ledger of the second end node is shown in Table 1.

TABLE 1

| | Local ledger | | | |
|---|---|---|---|---|
| End node peer ID | Quantity $n_{total}$ of data credential acceptance times | Quantity $n_{success}$ of data on-time sending times | Fulfillment proportion r | Credit value (credit) |
| Hash1 | 5 | 5 | 1 | 1 |
| Hash2 | 11 | 5 | 0.5 | 0.5 |
| Hash3 | 0 | 0 | 1 | 1 |

For example, the local ledger may include five pieces of information: an end node peer identifier (peer ID), a quantity of times that the second end node accepts the data credential of the first end node, a quantity of times that the first end node sends data on time, a fulfillment proportion r, and a credit value (credit).

After receiving a data credential of a requested end node, the requesting end node may search the local ledger for a record of the requested end node. If there is no record, a credit record of the requested end node may be created.

If the record of the requested end node exists in the local ledger of the requesting end node, a credit value of the requested end node may be directly compared with a credit value of another end node, so that a data credential of a requested end node is determined to be accepted, and the quantity of data credential acceptance times of the corresponding end node is modified in the ledger.

For example, the requesting end node may start a timer based on the delayed sending time rt indicated by the accepted data credential, to wait for receiving required content data. If the data is sent on time (that is, the timer is not up), the quantity of data on-time sending times of the corresponding end node is modified in the ledger. For example, the quantity of data on-time sending times is increased by 1, and the fulfillment proportion and the credit value are recalculated. If the requesting end node does not receive the required data sent by the requested end node when the timer is up, the requesting end node updates the fulfillment proportion r and the credit value (credit) based on the updated quantity of data credential acceptance times.

In particular, if the requesting end node receives the required content that is directly (immediately) sent by the requested end node, the quantity of data on-time sending times of the requested end node is increased by 1.

The foregoing uses an example in which the second end node manages the credit value of the first end node to describe a solution in which the end node evaluates the credit value of the end node interacting with the end node. The credit value that is evaluated by an end node and that is of the requested end node interacting with the end node is an important reference for whether the end node accepts the data credential of the requested end node. In other words, the credit value that is evaluated by the requesting end node and that is of the requested end node interacting with the requesting end node may help the requesting end node select an appropriate end node (for example, an end node that is legal and in a good running state) to receive data, so that security and robustness of a distributed network are improved.

In some embodiments of this application, an untrusted scenario in which a malicious end node exists is considered, and the requesting end node selects, based on the credit value of each requested end node, to accept a data credential of a requested end node, so that invulnerability of a system is improved. In addition, a mesh-pull distributed data distribution architecture is used in this application, and is applicable to a mobile distributed network with dynamic end nodes. For example, the data transmission solution provided in embodiments of this application is applicable to a scenario in which a plurality of terminals share a file or a high-definition video. For example, a plurality of terminals in a 1+8+N (mobile phone+wearable device+internet of things device) ecological local area network or education local area network share a file or a high-definition video.

Figure 10:
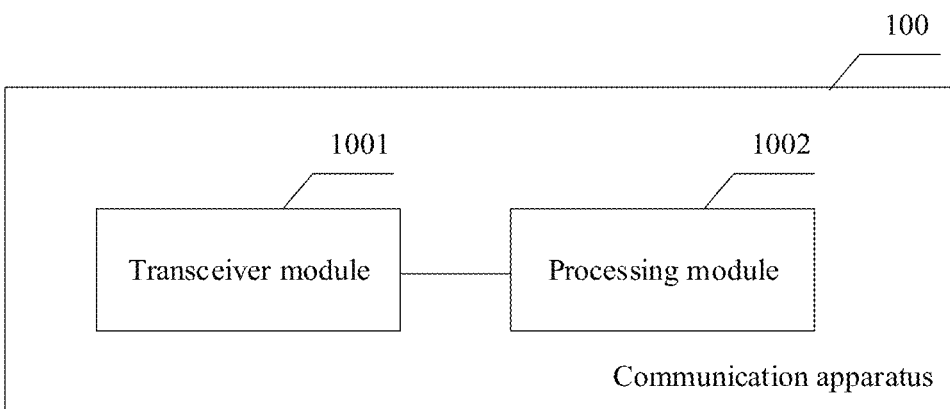
FIG. 10 is a schematic diagram of a structure of a communication apparatus according to some embodiments of this application.

The following describes a schematic diagram of a structure of a communication apparatus for implementing the data transmission method in the foregoing embodiments. FIG. 10 is a schematic diagram of a structure of a communication apparatus according to an embodiment of this application. The communication apparatus in FIG. 10 may be the first end node in the foregoing embodiment. As shown in FIG. 10, the communication apparatus 100 includes:

a transceiver module 1001, configured to send delayed transmission information to a second end node, where the delayed transmission information indicates first time information at which a first end node sends first data to the second end node; and a processing module 1002, configured to determine that the second end node accepts the delayed transmission information.

The transceiver module 1001 is further configured to send the first data to the second end node at target time based on the first time information by using the transceiver module 1001, where the target time is determined based on the first time information; or the processing module 1002 is configured to determine that the second end node refuses the delayed transmission information, and cancels transmission of the first data.

In some embodiments, the processing module 1002 is further configured to create a sending task of sending the first data to the second end node. The processing module 1002 is configured to cancel the sending task.

In some embodiments, the processing module 1002 is configured to skip creating the sending task of sending the first data to the second end node.

In some embodiments, the processing module 1002 is configured to: if the transceiver module 1001 receives a first message from the second end node, determine that the second end node accepts the delayed transmission information, where the first message is sent by the second end node after the delayed transmission information is received, the first message includes first indication information, and the first indication information indicates that the second end node allows the first end node to send the first data.

The transceiver module 1001 in FIG. 10 may be one module, or may be two independent modules. For example, the transceiver module 1001 is implemented by one transceiver. For another example, the transceiver module 1001 includes a sending module and a receiving module. A function of the sending module is implemented by a transmitter, and a function of the transceiver module is implemented by a receiver.

In some embodiments, the processing module 1002 is configured to: if the transceiver module 1001 does not receive a third message from the second end node in first duration after the transceiver module 1001 sends the delayed transmission information, determine that the second end node accepts the delayed transmission information, where the third information includes third indication information, and the third indication information indicates that the second end node refuses to allow the first end node to send the first data.

In some embodiments, the processing module 1002 is configured to: if the transceiver module 1001 receives a second message from the second end node, determine that the second end node refuses the delayed transmission information, where the second message is sent by the second end node after the delayed transmission information is received, the second message includes second indication information, and the second indication information indicates that the second end node refuses to allow the first end node to send the first data.

In some embodiments, the processing module 1002 is configured to: if the transceiver module 1001 does not receive a fourth message from the second end node in second duration after the transceiver module 1001 sends the delayed transmission information, determine that the second end node refuses the delayed transmission information, where the fourth information includes fourth indication information, and the fourth indication information indicates that the second end node allows the first end node to send the first data.

In some embodiments, the delayed transmission information is a data credential, the data credential indicates the first time information at which the first end node sends the first data to the second end node, and the data credential is further used to verify an identity of the first end node.

In some embodiments, the processing module 1002 is further configured to: determine first delay time information based on a load amount; and generate the delayed transmission information based on the first delay time information, where the first time information is obtained based on the first delay time information, and the first delay time information is obtained based on the load amount.

In some embodiments, a calculation equation in which the processing module determines the first delay time information based on the load amount is as follows:

$$rt1 = \frac{\sum_{f \in Q_i} \text{size}(f) + \text{size}(f')}{UB_i} + D_{i,j} \tag{5}$$

Herein, rt1 is the first delay time information, i indicates the first end node, j indicates the second end node, f and f' are file resources of an end node i (namely, the first end node), size(f) is a data size of the first data, size(f') is a data size of a queue being processed by the first end node (namely, a current to-be-sent data size), $UB_i$ is a sending bandwidth of the end node i (namely, a bandwidth for sending data to another end node), and $D_{i,j}$ is a data transmission delay between the end node i and an end node j. Generally, this parameter has small impact, and may be an optional parameter.

In some embodiments, the processing module 1002 is configured to: if the first data is stored and the load amount is greater than a load threshold, determine the first delay time information based on the load amount.

In some embodiments, the processing module 1002 is further configured to generate the delayed transmission information based on second time information, where the first time information is obtained based on the second time information, and the second time information is estimated time information at which the first end node obtains the first data.

In some embodiments, the processing module 1002 is configured to: determine second delay time information based on the second time information; and generate the delayed transmission information based on the second delay time information, where the first time information is obtained based on the second delay time information.

In some embodiments, a calculation equation in which the processing module 1002 determines the second delay time information based on the second time information is as follows:

$$rt2 = \frac{\sum_{f \in Q_i} \text{size}(f) + \text{size}(f')}{UB_i} + D_{i,j} + rt[i-1] \tag{6}$$

Herein, rt2 is the second delay time information, rt[i−1] is duration between the estimated current moment and the moment at which the first end node obtains the first data, i indicates the first end node, j indicates the second end node, f and f' are file resources of an end node i, size(f) is a data size of the first data, size(f') is a data size of a queue being processed by the first end node, $UB_i$ is a sending bandwidth of the end node i, and $D_{i,j}$ is a data transmission delay between the end node i and an end node j. Generally, this parameter has small impact, and may be an optional parameter.

In some embodiments, the transceiver module 1001 is further configured to receive a data request for obtaining second data. The processing module 1002 is further configured to: in a case of not storing the second data and not obtaining the second data, refuse the data request.

In some embodiments, the case of not storing the second data and not obtaining the second data includes: not storing the second data and not storing a first data credential. The first data credential is other than a credential for any end node to send the second data to the first end node.

Figure 11:
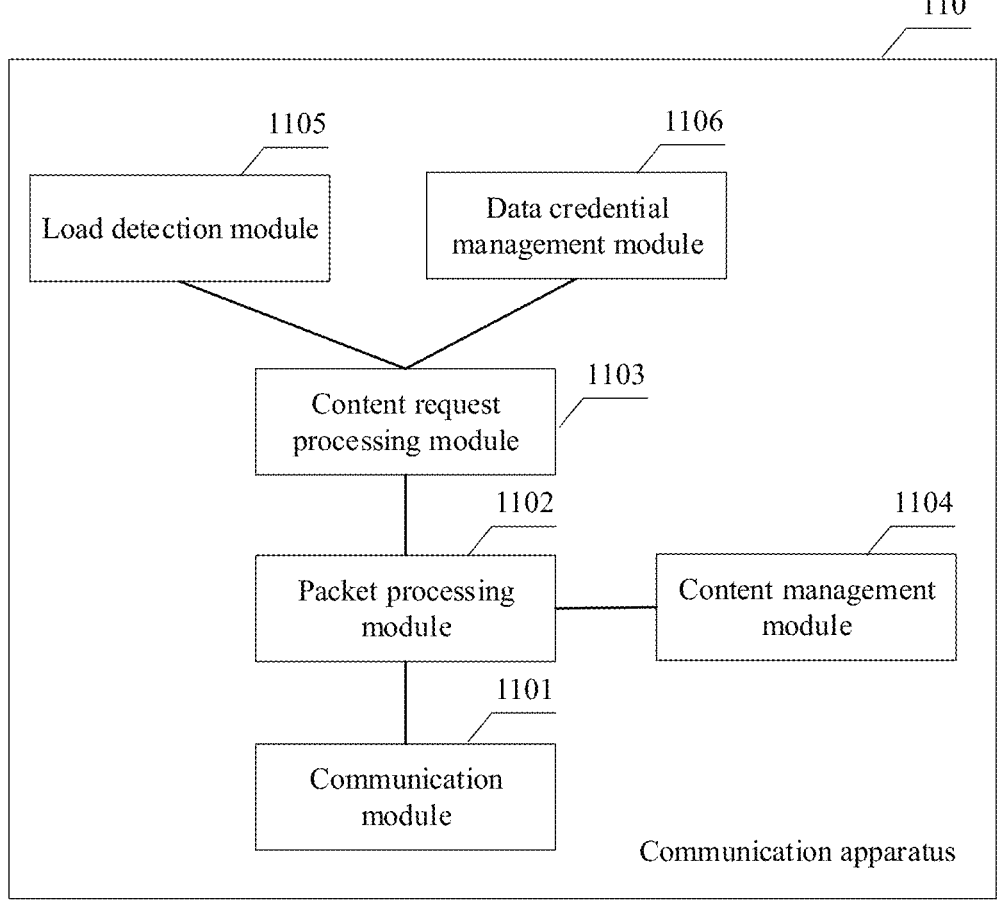
FIG. 11 is a schematic diagram of a structure of another communication apparatus according to some embodiments of this application.

FIG. 11 is a schematic diagram of a structure of another communication apparatus according to an embodiment of this application. The communication apparatus in FIG. 11 may be the first end node in the foregoing embodiment. As shown in FIG. 11, the communication apparatus 110 includes:

a communication module 1101, configured to accept and/or send a packet, for example, receiving a first data obtaining request (which may be referred to as a content request packet), sending delayed transmission information (which may be understood as a response message of the content request packet), and receiving a data credential of another end node (corresponding to estimated time for the another end node to send the content);

a packet processing module 1102, configured to: parse a received packet, or construct a packet that needs to be sent, for example, parsing a content request packet (namely, the first data obtaining request), parsing a received first response or second response, and constructing delayed transmission information; and deliver parsed message content to other modules for processing, for example, determining, based on a load condition, how to respond to the content request packet after receiving the content request packet, and determining how to process the data credential after receiving the data credential;

a content request processing module 1103, configured to: after receiving a content request packet, confirm with a content management module whether content data requested by the content data packet exists; if yes, obtain a current end node load of a local node from a load detection module, determine, based on the load condition, whether to send the content data in a timely manner or delay sending the content data, and calculate delayed sending time to send a data credential to a requesting end node; and if the requesting end node accepts the data credential, transmit the data credential to a data credential management module for processing;

a content management module 1104, configured to manage locally stored content data, and send corresponding content data to a requesting end node when receiving an indication of a data credential management module indicating that time for delaying sending the content data is reached;

a load detection module 1105, configured to monitor a current end node load, and when a content request processing module obtains an end node load, send the current end node load to the content request processing module; and a data credential management module 1106, configured to store a data credential of content data related to a local node (corresponding to estimated sending time of the content data), store a new data credential sent after a content request processing module generates the new data credential, and start a timer based on the estimated sending time to trigger sending of the corresponding content data; and further configured to store a received data credential of another end node, determine, based on a content identifier, whether a data credential corresponding to any content data exists when a content request processing module requests the data credential corresponding to any content data, and if yes, process the data credential of the another end node and send the processed data credential to the content request processing module.

It should be understood that the communication module 1101 corresponds to the transceiver module 1001 in FIG. 10. The packet processing module 1102, the content request processing module 1103, the content management module 1104, the load detection module 1105, and the data credential management module 1106 all correspond to the processing module 1002 in FIG. 10. The structure in FIG. 11 may be considered as a further refinement of the structure in FIG. 10. The communication apparatus in FIG. 10 and FIG. 11 may be a terminal device, for example, a mobile phone, a tablet computer, or a desktop computer, or may be a server.

Figure 12:
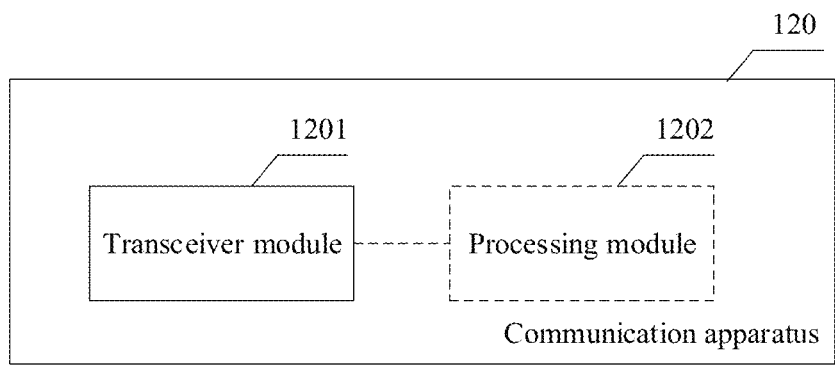
FIG. 12 is a schematic diagram of a structure of another communication apparatus according to some embodiments of this application.

FIG. 12 is a schematic diagram of a structure of another communication apparatus according to an embodiment of this application. The communication apparatus in FIG. 12 may be the second end node in the foregoing embodiment. As shown in FIG. 12, the communication apparatus 120 includes:

a transceiver module 1201, configured to receive delayed transmission information from a first end node, where the delayed transmission information indicates first time information at which the first end node sends first data to a second end node.

The transceiver module 1201 is further configured to send a first message generated by a processing module 1202, where the first message is sent after the delayed transmission information is received, the first message includes first indication information, and the first indication information indicates that the second end node allows the first end node to send first data; or the transceiver module 1201 is further configured to send a second message generated by a processing module 1202, where the second message is sent after the delayed transmission information is received, the second message includes second indication information, and the second indication information indicates that the second end node refuses to allow the first end node to send the first data.

In some embodiments, the delayed transmission information is a data credential, the data credential indicates the first time information at which the first end node sends the first data to the second end node, and the data credential is further used to verify an identity of the first end node.

In some embodiments, the processing module 1202 is further configured to: when a credit value of the first end node is greater than a credit value of a third end node, determine to send the first message, where the third end node is an end node allowed by the second end node to send the first data to the second end node.

In some embodiments, the processing module 1202 is further configured to: when the credit value of the first end node is greater than the credit value of the third end node, and a difference between the credit value of the first end node and the credit value of the third end node is greater than a credit threshold, determine to send the first message, where the third end node is an end node allowed by the second end node to send the first data to the second end node.

In some embodiments, the processing module 1202 is further configured to determine to send the first message when first time is earlier than second time, where the first time is time at which the first end node sends the first data to the second end node, the second time is time at which a fourth end node sends the first data to the second end node, and the fourth end node is an end node allowed by the second end node to send the first data to the second end node.

In some embodiments, the processing module 1202 is configured to: when an absolute value of a difference between the credit value of the first end node and a credit value of the fourth end node is less than the credit threshold, and the first time is earlier than the second time, determine to send the first message.

In some embodiments, the processing module 1202 is further configured to: if a data credential for the fourth end node to send the first data to the second end node is stored, obtain the credit value of the fourth end node.

In some embodiments, the processing module 1202 is further configured to: if a credential for any end node to send the first data to the second end node is not stored, determine to send the first message.

In some embodiments, the processing module 1202 is further configured to: when the credit value of the first end node is not greater than a credit value of a fifth end node, determine to send the second message, where the fifth end node is an end node allowed by the second end node to send the first data to the second end node.

In some embodiments, the processing module 1202 is further configured to: when the credit value of the first end node is not greater than the credit value of the fifth end node, and an absolute value of a difference between the credit value of the first end node and the credit value of the third end node is greater than the credit threshold, determine, by the second end node, to send the second message, where the fifth end node is an end node allowed by the second end node to send the first data to the second end node.

In some embodiments, the processing module 1202 is further configured to determine to send the second message when first time is not earlier than third time, where the first time is time at which the first end node sends the first data to the second end node, the third time is time at which a sixth end node sends the first data to the second end node, and the sixth end node is an end node allowed by the second end node to send the first data to the second end node.

In some embodiments, the processing module 1202 is configured to: when an absolute value of a difference between the credit value of the first end node and a credit value of the sixth end node is less than the credit threshold, and the first time is not earlier than the third time, determine to send the second message.

In some embodiments, the processing module 1202 is further configured to: if the first data from the first end node is received in a target time period, increase the credit value of the first end node, where the target time period is obtained based on the first time information; or if the first data from the first end node is not received in a target time period, decrease the credit value of the first end node.

Figure 13:
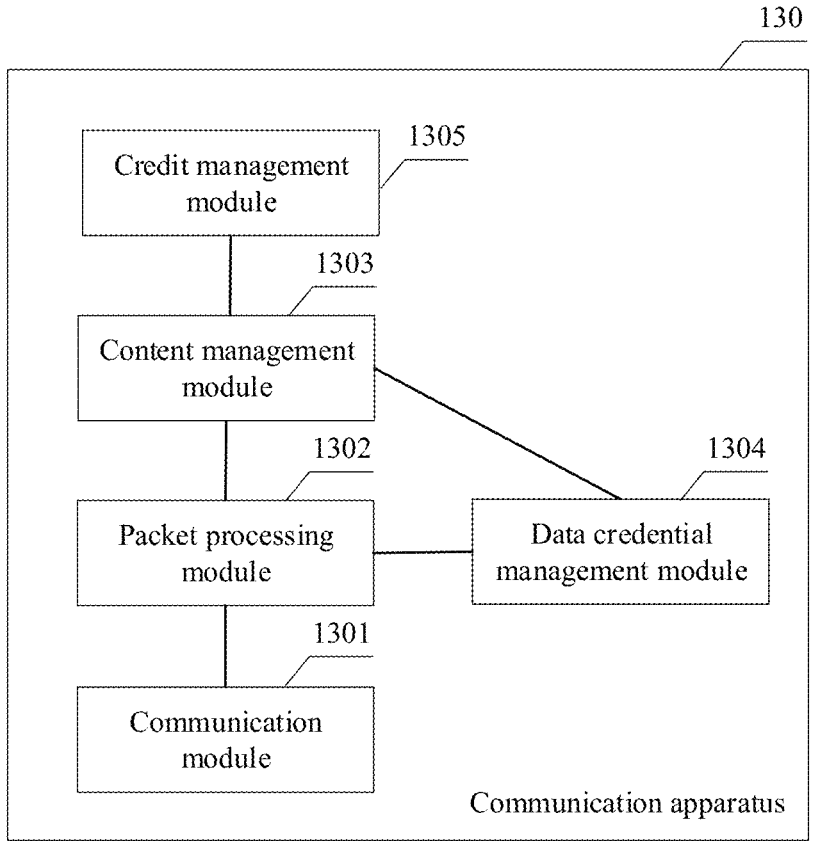
FIG. 13 is a schematic diagram of a structure of a communication apparatus according to some embodiments of this application.

FIG. 13 is a schematic diagram of a structure of a communication apparatus according to an embodiment of this application. The communication apparatus in FIG. 13 may be the second end node in the foregoing embodiment. As shown in FIG. 13, the communication apparatus 130 includes:

a communication module 1301, configured to accept and send a packet, for example, sending a content request packet (corresponding to a first data obtaining request), sending a first response or a second response, receiving content data (for example, first data) sent by another end node, and receiving a data credential (for example, delayed transmission information) of the another end node for the content request packet;

a packet processing module 1302, configured to: parse a received packet, or construct a packet that needs to be sent, for example, constructing a content request packet, constructing a first response or a second response, and parsing delayed transmission information; and deliver parsed message content to other modules for processing, for example, delivering content data to a content management module for processing after receiving the content data, and delivering a data credential to a data credential management module to determine how to respond after receiving the data credential;

a content management module 1303, configured to: manage and maintain local content data, including received content data of a source data end node; trigger a packet processing module based on an upper-layer requirement of a local end node to send a content request packet to an external end node; start a timer based on a received data credential of the required content data to determine whether the corresponding content data is received in specified time, so that a credit management module is notified to update a credit value of a corresponding end node; and determine whether to re-trigger the content request packet;

a data credential management module 1304, configured to: maintain and manage a data credential of content related to a local node (corresponding to estimated sending time of the content data), where after the communication module 1301 receives a new data credential, the new data credential is sent to the data credential management module for processing, and the data credential management module determines, based on a credit value of a corresponding end node obtained from a credit management module, to accept or refuse the data credential, and notify a content management module of estimated arrival time of required content data, so that the content management module monitors whether the corresponding content data can be received in specified time; and a credit management module 1305, configured to maintain and manage a credit value of an end node communicating with the credit management module, provide the credit value to a data credential management module, and determine to accept/refuse a data credential of a corresponding end node.

It should be understood that the communication module 1301 corresponds to the transceiver module 1201 in FIG. 12. The packet processing module 1302, the content management module 1303, the data credential management module 1304, and the credit management module 1305 all correspond to the processing module 1202 in FIG. 12. The structure in FIG. 13 may be considered as a further refinement of the structure in FIG. 12. The communication apparatus in FIG. 10 and FIG. 11 may be a terminal device, for example, a mobile phone, a tablet computer, or a desktop computer, or may be a network device.

It should be understood that division of modules in the communication apparatus is merely logical function division. During actual implementation, some or all of the modules may be integrated into one physical entity, or may be physically separated. For example, the modules may be independently disposed processing elements, or may be integrated into a chip in the terminal for implementation. In addition, the modules may be stored in a storage element in the controller in a form of program code, and a processing element in the processor invokes and performs functions of the modules. In addition, the modules may be integrated together or may be independently implemented. The processing element may be an integrated circuit chip, and has a signal processing capability. In some embodiments, operations in the foregoing methods or the foregoing modules can be implemented by using a hardware integrated logical circuit in the processing element, or by using instructions in a form of software. The processing element may be a general-purpose processor, for example, a network processor or a central processing unit (CPU), or may be one or more integrated circuits configured to implement the foregoing methods, for example, one or more application-specific integrated circuits (ASICs), or one or more microprocessors (e.g., digital signal processors (DSPs)), or one or more field-programmable gate arrays (FPGAs).

Figure 14:
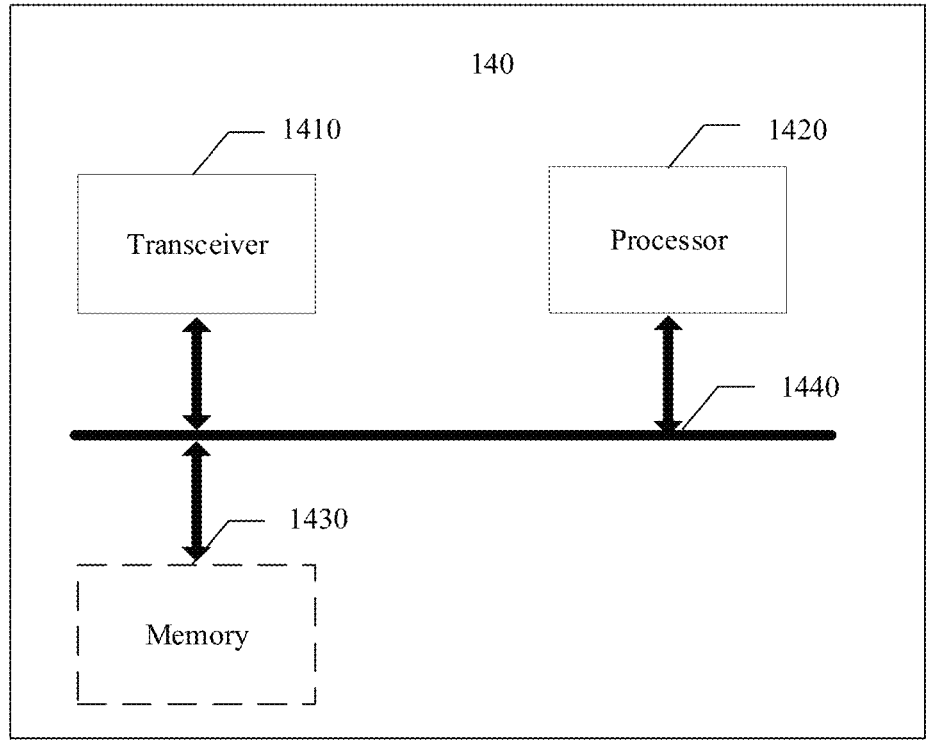
FIG. 14 is a schematic diagram of a structure of a communication apparatus according to some embodiments of this application.

FIG. 14 is a schematic diagram of a structure of a communication apparatus according to an embodiment of this application. The communication apparatus in FIG. 14 may be the first end node, or may be the second end node.

As shown in FIG. 14, the communication apparatus 140 includes at least one processor 1420, configured to implement a function of the first end node in the method provided in embodiments of this application, or configured to implement a function of the second end node in the method provided in embodiments of this application. The communication apparatus 140 may further include a transceiver 1410. The transceiver 1410 is configured to communicate with another device or apparatus through a transmission medium. The processor 1420 receives and sends data and/or signals through the transceiver 1410, and is configured to implement the method in the foregoing method embodiments.

In some embodiments, the communication apparatus 140 may further include at least one memory 1430, configured to store program instructions and/or data. The memory 1430 is coupled to the processor 1420. The coupling in some embodiments of this application may be an indirect coupling or a communication connection between apparatuses, units, or modules in an electrical form, a mechanical form, or another form, and is used for information exchange between the apparatuses, the units, or the modules. The processor 1420 may operate with the memory 1430 together. The processor 1420 may execute the program instructions stored in the memory 1430. At least one of the at least one memory may be included in the processor.

A connection medium between the transceiver 1410, the processor 1420, and the memory 1430 is not limited in some embodiments of this application. In some embodiments of this application, the memory 1430, the processor 1420, and the transceiver 1410 are connected through a bus 1440 in FIG. 14. The bus is represented by using a bold line in FIG. 14. A manner of connection between other components is merely an example for description, and imposes no limitation. The bus may be classified into an address bus, a data bus, a control bus, and the like. For ease of representation, only one bold line is used to represent the bus in FIG. 14, but this does not mean that there is only one bus or only one type of bus.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, operations, and logical block diagrams disclosed in embodiments of this application. The general purpose processor may be a microprocessor or any conventional processor or the like. The operations of the method disclosed with reference to embodiments of this application may be directly performed by a hardware processor, or may be performed by using a combination of hardware in the processor and a software module.

It may be understood that when the communication apparatus 140 is the first end node, the transceiver 1410 implements a function of the transceiver module 1001, and the processor 1420 implements a function of the processing module 1002. Alternatively, when the communication apparatus 140 is the first end node, the transceiver 1410 implements a function of the communication module 1101, and the processor 1420 implements functions of the packet processing module 1102, the content request processing module 1103, the content management module 1104, the load detection module 1105, and the data credential management module 1106. When the communication apparatus 140 is the second end node, the transceiver 1410 implements a function of the transceiver module 1201, and the processor 1420 implements a function of the processing module 1202. Alternatively, when the communication apparatus 140 is the second end node, the transceiver 1410 implements a function of the communication module 1301, and the processor 1420 implements functions of the packet processing module 1302, the content management module 1303, the data credential management module 1304, and the credit management module 1305.

This application further provides a computer-readable storage medium. The computer-readable storage medium stores computer code. When the computer code runs on a computer, the computer is enabled to perform the method in the foregoing embodiment.

This application further provides a computer program product. The computer program product includes computer code or a computer program. When the computer code or the computer program runs on a computer, the data transmission method in the foregoing embodiment is performed.

This application further provides a communication system, including the first end node and the second end node.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:

sending, by a first end node, delayed transmission information to a second end node, wherein the delayed transmission information indicates first time information at which the first end node sends first data to the second end node, wherein, before sending the delayed transmission information, the method further comprises:

determining, by the first end node, first delay time information based on a load amount, wherein the first delay time information is obtained based on the load amount and, if the first end node stores the first data and the load amount is greater than a load threshold, the first time information is based on the load amount;

determining, by the first end node, that the second end node accepts the delayed transmission information; and sending, by the first end node, the first data to the second end node at target time based on the first time information, wherein the target time is determined based on the first time information; or determining, by the first end node, that the second end node refuses the delayed transmission information, and canceling, by the first end node, transmitting the first data.

2. The method according to claim 1, wherein the determining, by the first end node, that the second end node accepts the delayed transmission information comprises:

receiving, by the first end node, a first message from the second end node, wherein the first message is sent by the second end node after the delayed transmission information is received; and the first message comprises first indication information, and the first indication information indicates that the second end node allows the first end node to send the first data.

3. The method according to claim 1, wherein the determining, by the first end node, that the second end node refuses the delayed transmission information comprises:

receiving, by the first end node, a second message from the second end node, wherein the second message is sent by the second end node after the delayed transmission information is received; and the second message comprises second indication information, and the second indication information indicates that the second end node refuses to allow the first end node to send the first data.

4. The method according to claim 1, wherein the delayed transmission information is a data credential, the data credential indicates the first time information at which the first end node sends the first data to the second end node, and the data credential is further used to verify an identity of the first end node.

5. The method according to claim 1, wherein before the sending, by the first end node, the delayed transmission information to the second end node, the method further comprises:

generating, by the first end node, the delayed transmission information based on the first delay time information, wherein the first time information is obtained based on the first delay time information.

6. The method according to claim 1, wherein before the sending, by the first end node, the delayed transmission information to the second end node, the method further comprises:

generating, by the first end node, the delayed transmission information based on second time information, wherein the first time information is obtained based on the second time information, and the second time information is estimated time information at which the first end node obtains the first data.

7. A data transmission method, comprising:

sending, by a second end node, a first message, wherein the first message is sent after delayed transmission information is received, the delayed transmission information is sent by a first end node, the delayed transmission information indicates first time information at which the first end node sends first data to the second end node, the first message comprises first indication information, and the first indication information indicates that the second end node allows the first end node to send the first data and, before the first end node sends the delayed transmission information, the first end node determines first delay time information based on a load amount, wherein the first delay time information is obtained based on the load amount and, if the first end node stores the first data and the load amount is greater than a load threshold, the first time information is based on the load amount; or sending, by the second end node, a second message, wherein the second message is sent after the delayed transmission information is received, the second message comprises second indication information, and the second indication information indicates that the second end node refuses to allow the first end node to send the first data.

8. The method according to claim 7, wherein the delayed transmission information is a data credential, the data credential indicates the first time information at which the first end node sends the first data to the second end node, and the data credential is further used to verify an identity of the first end node.

9. The method according to claim 7, wherein before the sending, by the second end node, the first message, the method further comprises:

when a credit value of the first end node is greater than a credit value of a third end node, determining, by the second end node, to send the first message, wherein the third end node is an end node allowed by the second end node to send the first data to the second end node.

10. The method according to claim 7, wherein before the sending, by the second end node, the first message, the method further comprises:

determining, by the second end node, to send the first message when first time is earlier than second time, wherein the first time is time at which the first end node sends the first data to the second end node, the second time is a time at which a fourth end node sends the first data to the second end node, and the fourth end node is an end node allowed by the second end node to send the first data to the second end node.

11. The method according to claim 7, wherein before the sending, by the second end node, the second message, the method further comprises:

when a credit value of the first end node is not greater than a credit value of a fifth end node, determining, by the second end node, to send the second message, wherein the fifth end node is an end node allowed by the second end node to send the first data to the second end node.

12. The method according to claim 7, wherein before the sending, by the second end node, the second message, the method further comprises:

determining to send the second message when first time is not earlier than third time, wherein the first time is time at which the first end node sends the first data to the second end node, the third time is a time at which a sixth end node sends the first data to the second end node, and the sixth end node is an end node allowed by the second end node to send the first data to the second end node.

13. The method according to claim 9, wherein after the second end node receives the delayed transmission information from the first end node, the method further comprises:

if the second end node receives the first data from the first end node in a target time period, increasing the credit value of the first end node, wherein the target time period is obtained based on the first time information; or if the second end node does not receive the first data from the first end node in the target time period, decreasing the credit value of the first end node.

14. The method according to claim 10, wherein after the second end node receives the delayed transmission information from the first end node, the method further comprises:

if the second end node receives the first data from the first end node in a target time period, increasing a credit value of the first end node, wherein the target time period is obtained based on the first time information; or if the second end node does not receive the first data from the first end node in the target time period, decreasing the credit value of the first end node.

15. The method according to claim 11, wherein after the second end node receives the delayed transmission information from the first end node, the method further comprises:

if the second end node receives the first data from the first end node in a target time period, increasing the credit value of the first end node, wherein the target time period is obtained based on the first time information; or if the second end node does not receive the first data from the first end node in the target time period, decreasing the credit value of the first end node.

16. The method according to claim 12, wherein after the second end node receives the delayed transmission information from the first end node, the method further comprises:

if the second end node receives the first data from the first end node in a target time period, increasing a credit value of the first end node, wherein the target time period is obtained based on the first time information; or if the second end node does not receive the first data from the first end node in the target time period, decreasing the credit value of the first end node.

17. A communication apparatus, comprising:

a memory configured to store computer-executable instructions; and a processor configured to execute the computer-executable instructions stored in the memory, and when the processor executes the computer-executable instructions, the communication apparatus is enabled to:

send delayed transmission information to a second end node, wherein the delayed transmission information indicates first time information at which the communication apparatus sends first data to the second end node, wherein, before sending the delayed transmission information, the communication apparatus is enabled to:

determine first delay time information based on a load amount, wherein the first delay time information is obtained based on the load amount and, if the communication apparatus stores the first data and the load amount is greater than a load threshold, the first time information is based on the load amount;

determining that the second end node accepts the delayed transmission information; and send the first data to the second end node at target time based on the first time information, wherein the target time is determined based on the first time information; or determine that the second end node refuses the delayed transmission information, and canceling transmitting the first data.

18. The communication apparatus according to claim 17, wherein, when the processor executes the computer-executable instructions, the communication apparatus is furthered enabled to:

receive a first message from the second end node, wherein the first message is sent by the second end node after the delayed transmission information is received; and the first message comprises first indication information, and the first indication information indicates that the second end node allows the communication apparatus to send the first data.

19. The communication apparatus according to claim 17, wherein, when the processor executes the computer-executable instructions, the communication apparatus is furthered enabled to:

receive a second message from the second end node, wherein the second message is sent by the second end node after the delayed transmission information is received; and the second message comprises second indication information, and the second indication information indicates that the second end node refuses to allow the communication apparatus to send the first data.

20. The communication apparatus according to claim 17, wherein the delayed transmission information is a data credential, the data credential indicates the first time information at which the communication apparatus sends the first data to the second end node, and the data credential is further used to verify an identity of the communication appratus.

* * * * *